US011009286B2

(12) United States Patent
Lee et al.

(10) Patent No.: US 11,009,286 B2
(45) Date of Patent: May 18, 2021

(54) REFRIGERATOR

(71) Applicant: Samsung Electronics Co., Ltd, Suwon-si (KR)

(72) Inventors: Jeong Hyun Lee, Suwon-si (KR); Seang Won Lee, Bucheon-si (KR); Yang-Yeol Gu, Gwangju (KR); Seok Jun Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/726,102

(22) Filed: Dec. 23, 2019

(65) Prior Publication Data

US 2020/0132357 A1 Apr. 30, 2020

Related U.S. Application Data

(63) Continuation of application No. 15/857,408, filed on Dec. 28, 2017, now Pat. No. 10,544,983.

(Continued)

(30) Foreign Application Priority Data

Jan. 3, 2017 (KR) ........................ 10-2017-0000956
Aug. 31, 2017 (KR) ........................ 10-2017-0111502

(51) Int. Cl.
*F25D 23/02* (2006.01)
*E05D 11/00* (2006.01)

(Continued)

(52) U.S. Cl.
CPC ........ *F25D 23/025* (2013.01); *E05D 11/0081* (2013.01); *F25D 23/028* (2013.01);

(Continued)

(58) Field of Classification Search
CPC .... F25D 23/025; F25D 29/005; F25D 23/028; F25D 2400/36; F25D 2400/40;

(Continued)

(56) References Cited

U.S. PATENT DOCUMENTS 7,281,391 B2 * 10/2007 Marret .................. F25D 23/126 312/405
10,342,363 B2 * 7/2019 Park ...................... F25D 29/005

(Continued)

FOREIGN PATENT DOCUMENTS

CN 1715814 A 1/2006
CN 1717525 A 1/2006

(Continued)

OTHER PUBLICATIONS

Supplementary European Search Report dated Aug. 21, 2019 in connection with European Patent Application No. 18 73 6521, 7 pages.

(Continued)

*Primary Examiner* — Hanh V Tran

(57) ABSTRACT

A refrigerator includes a main body having a storage compartment; an inner door rotatably provided at the main body; and an outer door configured to open and close the storage compartment together with the inner door and rotatably provided at the inner door, wherein the inner door includes a connector seating portion disposed at an upper portion of the inner door and configured to connect a first electric wire extending from the main body to the inner door to a second electric wire extending from the outer door to the inner door. Connections between the electric wires are improved so as not to be influenced by the inner and outer doors such that durability of the electric wires can be improved.

17 Claims, 30 Drawing Sheets

Related U.S. Application Data

(60) Provisional application No. 62/524,882, filed on Jun. 26, 2017.

(51) Int. Cl.
*F25D 29/00* (2006.01)
*E05D 3/02* (2006.01)
*E05D 5/10* (2006.01)

(52) U.S. Cl.
CPC .............. *F25D 29/005* (2013.01); *E05D 3/02* (2013.01); *E05D 2005/102* (2013.01); *E05Y 2900/31* (2013.01); *F25D 2323/024* (2013.01); *F25D 2400/36* (2013.01); *F25D 2400/40* (2013.01)

(58) Field of Classification Search
CPC ........... F25D 2323/024; E05D 11/0081; E05D 2005/102; E05D 3/02; E05Y 2900/31
See application file for complete search history.

(56) References Cited

U.S. PATENT DOCUMENTS

| | | | | |
|---|---|---|---|---|
| 10,401,072 | B2* | 9/2019 | Lee | F25D 17/067 |
| 2004/0182104 | A1* | 9/2004 | Choi | F25D 23/028 62/389 |
| 2004/0216471 | A1* | 11/2004 | Kim | F25D 23/12 62/126 |
| 2005/0284159 | A1* | 12/2005 | Kim | F25D 23/028 62/126 |
| 2006/0064846 | A1* | 3/2006 | Espindola | E05D 11/0081 16/223 |
| 2007/0204648 | A1* | 9/2007 | Smale | F25D 23/126 62/389 |
| 2007/0251261 | A1* | 11/2007 | Son | F25D 23/126 62/390 |
| 2008/0165509 | A1* | 7/2008 | Kendall | F25D 23/028 361/735 |
| 2010/0043466 | A1* | 2/2010 | Oh | F25D 23/12 62/125 |
| 2011/0181163 | A1 | 7/2011 | Han et al. | |
| 2011/0209495 | A1 | 9/2011 | Park | |
| 2012/0242207 | A1* | 9/2012 | Mershon | F25D 23/00 312/237 |
| 2013/0047656 | A1 | 2/2013 | Kang et al. | |
| 2014/0139091 | A1 | 5/2014 | Oh et al. | |
| 2015/0260443 | A1 | 9/2015 | Lee et al. | |
| 2015/0260447 | A1* | 9/2015 | Kim | G08B 5/36 312/405 |
| 2016/0033194 | A1 | 2/2016 | Sumihiro et al. | |
| 2016/0084560 | A1 | 3/2016 | Jeong et al. | |
| 2016/0117022 | A1 | 4/2016 | Kim et al. | |
| 2016/0123055 | A1 | 5/2016 | Ueyama | |
| 2016/0123657 | A1* | 5/2016 | Kim | G03B 29/00 62/125 |
| 2016/0201975 | A1* | 7/2016 | Bazzucchi | E05D 11/0081 312/405 |
| 2017/0188721 | A1* | 7/2017 | Park | F25D 27/00 |
| 2017/0350644 | A1* | 12/2017 | Xia | F25D 23/02 |
| 2018/0149420 | A1* | 5/2018 | Lee | G02B 6/009 |
| 2018/0187952 | A1* | 7/2018 | Lv | E05D 11/0081 |
| 2018/0187956 | A1* | 7/2018 | Kim | F25D 23/02 |
| 2018/0252463 | A1 | 9/2018 | Grimminger et al. | |
| 2018/0266751 | A1 | 9/2018 | Lim et al. | |
| 2018/0328641 | A1 | 11/2018 | Lee et al. | |
| 2018/0372394 | A1 | 12/2018 | Kim et al. | |
| 2019/0024962 | A1 | 1/2019 | Lee et al. | |
| 2019/0032994 | A1 | 1/2019 | Choi | |
| 2019/0086141 | A1 | 3/2019 | Kim et al. | |

FOREIGN PATENT DOCUMENTS

| | | | |
|---|---|---|---|
| CN | 102695933 | A | 9/2012 |
| CN | 103105031 | A | 5/2013 |
| CN | 104466826 | A | 3/2015 |
| EP | 1821052 | A2 | 8/2007 |
| EP | 2592371 | A2 | 5/2013 |
| JP | 2002098472 | A | 4/2002 |
| KR | 10-2008-0038965 | A | 5/2008 |
| WO | 2004/048865 | A1 | 6/2004 |
| WO | 2016/175563 | A1 | 11/2016 |

OTHER PUBLICATIONS

International Search Report for PCT Patent Application No. PCT/KR2018/000102 dated Apr. 24, 2018; 4 pages.

Office Action dated Dec. 18, 2020 in connection with Chinese Patent Application No. 201880004000.5, 19 pages.

* cited by examiner

REFRIGERATOR

CROSS-REFERENCE TO RELATED APPLICATIONS

This application is a continuation of U.S. patent application Ser. No. 15/857,408 filed on Dec. 28, 2017, which is based on and claims priority under 35 U.S.C. § 119 to Korean Patent Application No. 10-2017-0000956 filed on Jan. 3, 2017, Korean Patent Application No. 10-2017-0111502 filed on Aug. 31, 2017, and U.S. Provisional Patent Application No. 62/524,882 filed on Jun. 26, 2017, the disclosures of which are herein incorporated by reference in their entirety.

TECHNICAL FIELD

Embodiments of the present disclosure relate to a refrigerator, and more particularly, to a refrigerator with an improved door structure.

BACKGROUND

Generally, a refrigerator is a home appliance capable of freshly storing foods by providing a storage compartment configured to store the foods and a cold air supply device configured to supply cold air to the storage compartment.

A refrigerator may be classified according to the type of storage compartment and type of door.

There are top mounted freezer (TMP) type refrigerators in which a storage compartment is divided into an upper portion and a lower portion by a horizontal partition wall to form a freezing compartment at an upper side of the storage compartment and a refrigerating compartment at a lower side thereof, and a bottom mounted freezer (BMF) type refrigerator in which a storage compartment is divided into an upper portion and a lower portion by a horizontal partition wall to form a refrigerating compartment at an upper side of the storage compartment and a freezing compartment at a lower side thereof.

In addition, there are a side-by-side (SBS) type refrigerator in which a storage compartment is divided into left and right sides by a vertical partition wall to form a freezing compartment at one of the left and right sides and a refrigerating compartment chamber at the other side thereof; and a French door type refrigerator (FDR) in which a storage compartment is divided into an upper portion and a lower portion by a horizontal partition to form a refrigerating compartment at an upper side of the storage compartment and a freezing compartment at a lower side thereof, wherein the refrigerating compartment at the upper side is opened and closed by a pair of doors.

Lately, various electronic devices are being added to refrigerators to supplement and improve functions of the refrigerator in addition to original functions thereof. However, as various devices are added to a refrigerator, problems with efficiently disposing each of the various devices in the refrigerator and electrically connecting these devices to a controller or a power supply occur.

SUMMARY

To address the above-discussed deficiencies, it is a primary object to provide a refrigerator having an improved arrangement of electronic devices and improved connections between these electronic devices and the refrigerator.

Also, it is another aspect of the present disclosure to provide a refrigerator in which electric wires are minimally exposed.

Further, it is still another aspect of the present disclosure to provide a refrigerator having a display device.

Furthermore, it is yet another aspect of the present disclosure to provide a refrigerator in which an arrangement of electric components is improved.

Additional aspects of the disclosure will be set forth in part in the description that follows and, in part, will be obvious from the description, or may be learned by practice of the disclosure.

In accordance with one aspect of the present disclosure, a refrigerator includes a main body having a storage compartment; an inner door rotatably provided at the main body; and an outer door configured to open and close the storage compartment together with the inner door and rotatably provided at the inner door, wherein the inner door includes a connector seating portion disposed at an upper portion of the inner door and configured to connect a first electric wire, which is separably connected to a main body electric wire of the main body and disposed to pass through the inner door, to a second electric wire extending from the outer door to the inner door.

The inner door and the outer door may move between an open state for opening the storage compartment, a closed state for sealing the storage compartment, and a partially open state in which the outer door is opened from the inner door, and, when the inner door and the outer door move between the open state, the closed state, and the partially open state, lengths of the first and second electric wires from the main body and the outer door to the connector seating portion may be kept constant.

The connector seating portion may form a seating space in which a first connector of the first electric wire and a second connector of the second electric wire are separably coupled.

The outer door may be provided such that the first and second connectors separate from each other in the connector seating portion such that the outer door becomes electrically disconnected from the inner door.

The inner door may further include a hinge assembly connected to the connector seating portion and configured to form a center of rotation of the outer door.

The hinge assembly may guide the second electric wire from the center of rotation of the outer door to the connector seating portion.

The hinge assembly may form a guide space from the center of rotation of the outer door to the connector seating portion so as to prevent the second electric wire from being exposed to the outside.

The hinge assembly may be configured to space apart the center of rotation of the outer door from the inner door.

The outer door may include an assembly insertion portion formed at a surface facing the inner door and provided to allow the hinge assembly to be inserted thereinto so as not to interfere with a rotation of the inner door.

The first electric wire may be disconnected from either the main body electric wire or the second electric wire such that the inner door or the outer door may be configured to be selectively separable.

The outer door may be provided to be separable from the inner door together with the second electric wire, and the inner door may be provided to be separable from the main body together with the first electric wire.

The outer door may further include a display device provided at a front surface thereof and configured to be able to output an image, and the second electric wire may be coupled to the display device.

The outer door may be provided to cover a front surface of the inner door.

In accordance with another aspect of the present disclosure, a refrigerator includes a main body having a storage compartment; an inner door rotatably installed at the main body and having an inner electric wire connected to a main body electric wire of the main body and configured to pass through the inner door; and an outer door connected to an electric device of the outer door having an outer electric wire provided to be separable from the inner electric wire and rotatably provided at the inner door, wherein the inner electric wire disconnects from either the main body electric wire or the outer electric wire such that the inner door or the outer door is configured to be selectively separable.

The outer door may be provided to be separable from the inner door together with the outer electric wire, and the inner door may be provided to be separable from the main body together with the inner electric wire.

The refrigerator may further include a connector seating portion formed at an upper portion of the inner door to form a space in which a first connector of the outer electric wire and a second connector of the inner electric wire are coupled.

The inner door and the outer door may move between an open state for opening the storage compartment, a closed state for sealing the storage compartment, and a partially open state in which the outer door is opened from the inner door, and, when the inner door and the outer door move between the open state, the closed state, and the partially open state, lengths of the inner and outer electric wires from the main body and the outer door to the connector seating portion may be kept constant.

The connector seating portion may form a seating space in which a first connector of the inner electric wire and a second connector of the outer electric wire are separably coupled.

The outer door may be provided such that the first and second connectors separate from each other in the connector seating portion such that the outer door becomes electrically disconnected from the inner door.

The outer door may further include a hinge assembly having a guide space extending from a center of rotation of the outer door to the connector seating portion so as to prevent the outer electric wire from being exposed to the outside, connected to the connector seating portion, and configured to form the center of rotation of the outer door.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
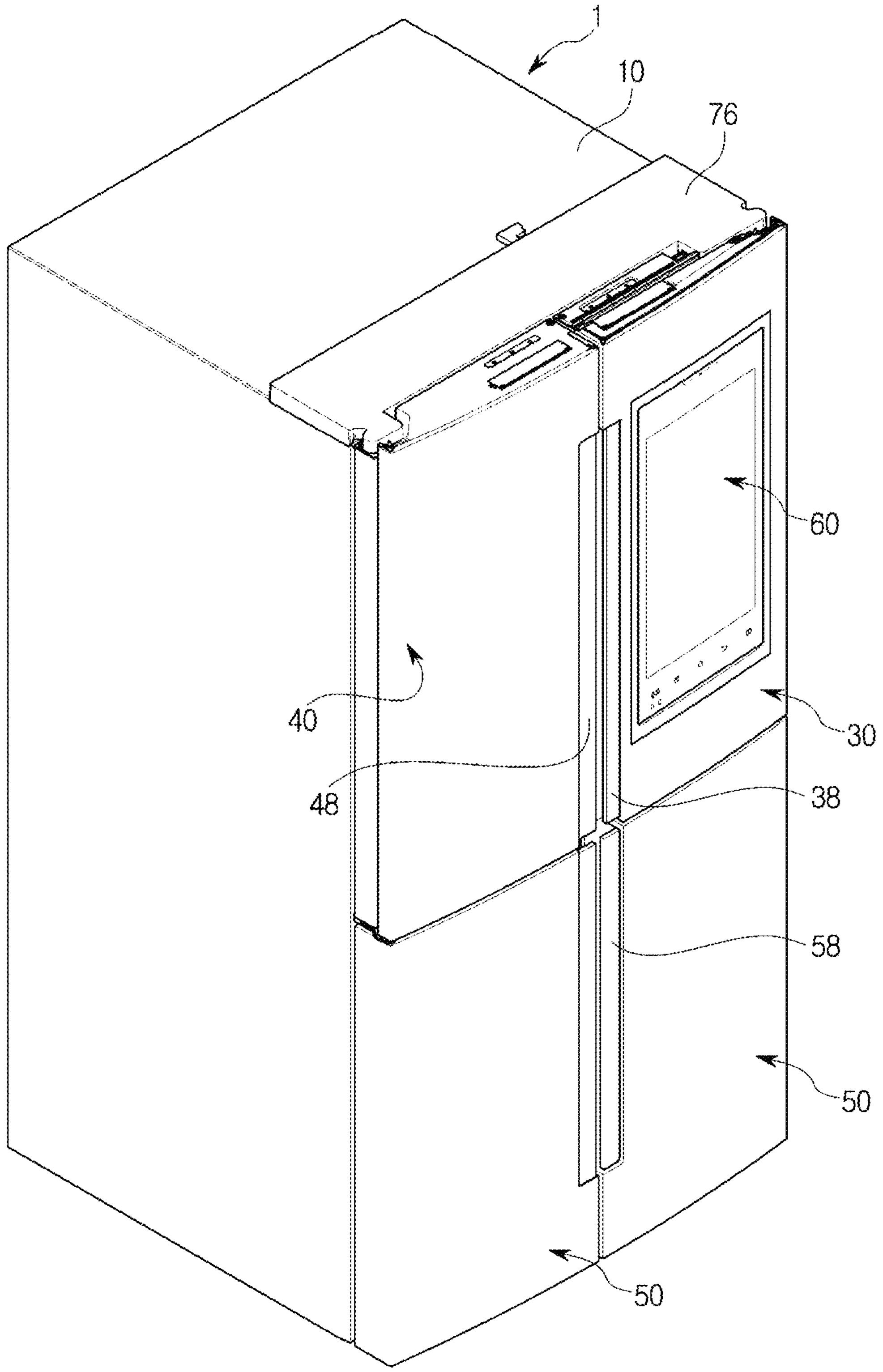
FIG. 1 is a perspective view of a refrigerator according to one embodiment of the present disclosure.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described herein and configurations shown in the accompanying drawings are merely preferred examples of the present disclosure, and various modified examples that may replace the embodiments and the accompanying drawings of the present disclosure may be made at the time at which the present application is filed.

Further, like reference numerals or symbols given in the various drawings of the present specification indicate parts or components that perform substantially the same functions.

Also, the terms used herein are used to describe the embodiments and are not intended to restrict and/or limit the present disclosure. Unless the context clearly dictates otherwise, the singular form includes the plural form. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Further, it should be understood that terms including ordinals such as "a first," "a second," and the like may be used herein to describe various components, but the components are not limited to the terms, and these are used only for the purpose of distinguishing one component from another. For example, without departing from the scope of the present disclosure, a first component may be referred to as a second component, and similarly, a second component may also be referred to as a first component. The term "and/or" includes a combination of a plurality of related listed items and any one item of the plurality of related listed items.

Hereinafter, embodiments of the present disclosure will be described in detail with reference to the accompanying drawings.

Figure 2:
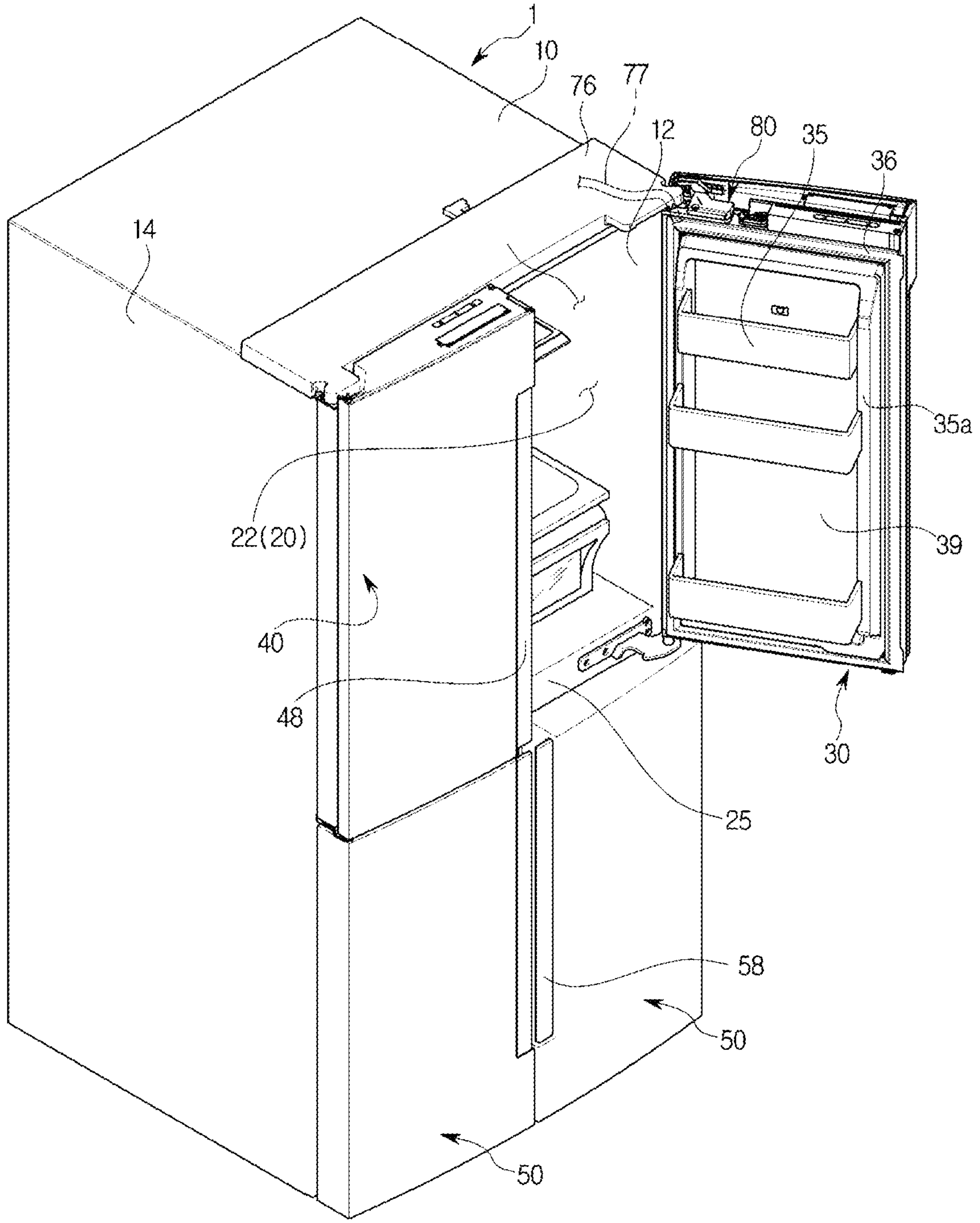
FIG. 2 is a perspective view illustrating a state in which a door of the refrigerator according to one embodiment of the present disclosure is opened.

FIG. 1 is a perspective view of a refrigerator according to one embodiment of the present disclosure, and FIG. 2 is a perspective view illustrating a state in which a door of the refrigerator according to one embodiment of the present disclosure is opened.

A refrigerator 1 includes a main body 10, a storage compartment 20 formed inside the main body 10 and comparted into upper and lower portions, a door 30 configured to open and close the storage compartment 20, and a cold air supply device (not shown) configured to supply cold air to the storage compartment 20.

The main body 10 may include an inner case 12 configured to form the storage compartment 20, an outer case 14 connected to the outside of the inner case 12 to form an exterior of the main body 10, and insulation (not shown) to be foamed between the inner case 12 and the outer case 14 to insulate the storage compartment 20.

A main body cover 76 may be provided at an upper portion of the main body 10 to prevent a configuration of a power supply unit, a control unit, or the like, which is not shown, from being exposed to the outside.

The cold air supply device may generate cold air using a cooling cycle that compresses, condenses, expands, and evaporates a refrigerant.

A front surface of the storage compartment 20 may be provided to be open, and the storage compartment 20 may be comparted into a refrigerating compartment 22 at an upper side thereof and a freezing compartment (not shown) at a lower side thereof by a horizontal partition wall 25. The refrigerating compartment 22 may be opened and closed by a pair of doors 30 and 40 rotatably coupled to the main body 10, and the freezing compartment may also be opened and closed by a pair of doors 50 rotatably coupled to the main body. The shapes of the doors 30, 40, and 50 are not limited, and a sliding door configured to slide to open and close may be applied thereto.

The pair of doors 30 and 40 configured to open and close the refrigerating compartment 22 may be laterally disposed thereat. For convenience in the following description, the door 30 disposed at a right side in the drawing is referred to as a first door 30, and the door 40 disposed at a left side therein is referred to as a second door 40. For convenience of description, in a relationship between the first and second doors 30 and 40 of the refrigerating compartment 22 and the doors 50 of the freezing compartment, the first and second doors 30 and 40 of the refrigerating compartment 22 are referred to as upper doors 30 and 40, and the doors 50 of the freezing compartment are referred to as a lower door 50. A first door handle 38 is grippably provided at the first door 30 to open and close the first door 30, and a second door handle 48 is grippably provided at the second door 40 to open and close the second door 40. Further, a lower door handle 58 is grippably provided at the lower door 50 to open and close the lower door 50.

The first door 30 may open and close a right side portion of the refrigerating compartment 22, and the second door 40 may open and close the remaining portion of the refrigerating compartment 22. A door shelf 35 may be provided at a rear surface of each of the first door 30 and the second door 40 to receive foods.

The door shelf 35 may include a shelf supporter **35*a* extending vertically from the first and second doors 30 and 40 to support the door shelf 35 at left and right sides thereof. The shelf supporter 35*a* may be separably provided at each of the doors 30, 40, and 50 as a separate configuration, and, in this embodiment, the shelf supporter 35*a* is provided to be formed to extend from each of the doors 30, 40, and 50**.

Further, a gasket 36 may be provided at an edge of the rear surface of each of the first door 30 and the second door 40 to seal a gap between the main body 10 and the first and second doors 30 and 40 in a state in which the first and second doors 30 and 40 are closed.

The gasket 36 may be installed in a form of a loop along the edge of the rear surface of each of the first door 30 and the second door 40, and a magnet (not shown) may be include inside the gasket 36.

Meanwhile, in a state in which the first door 30 and the second door 40 are closed, a gap may occur between the first door 30 and the second door 40, and thus a bar assembly (not shown) may be provided to seal the gap.

Figure 3:
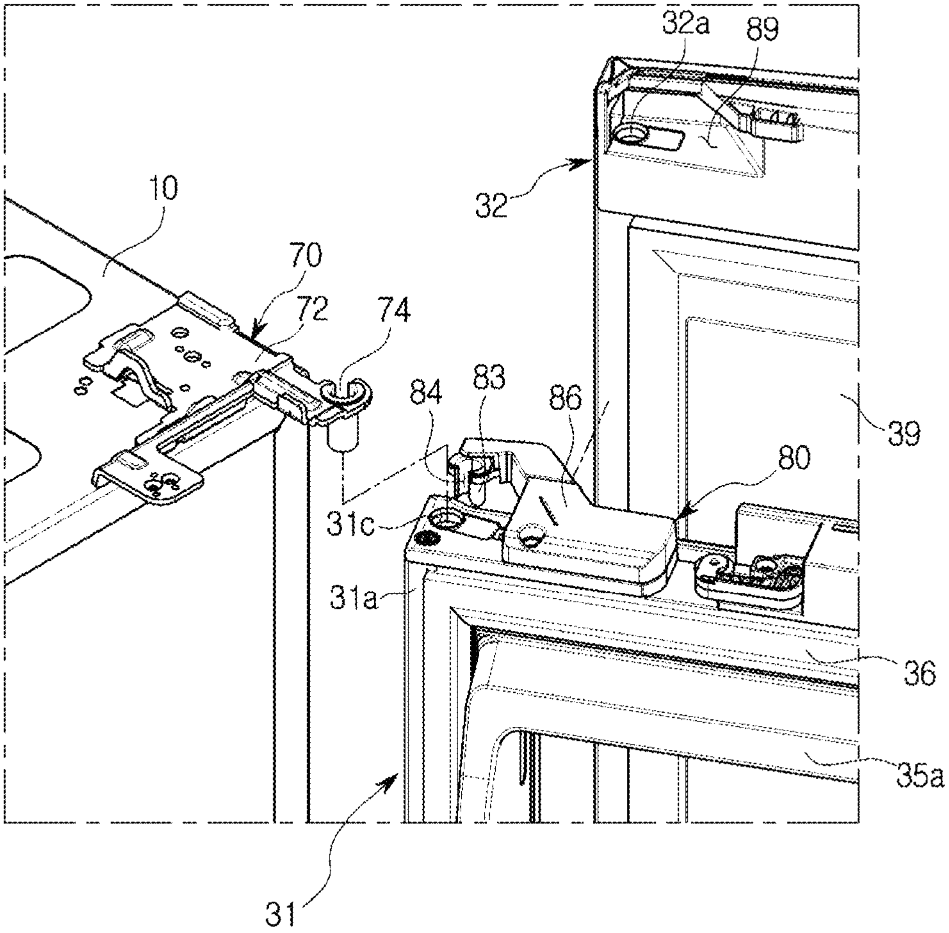
FIG. 3 is an exploded view of some components of the refrigerator according to one embodiment of the present disclosure.
Figure 4:
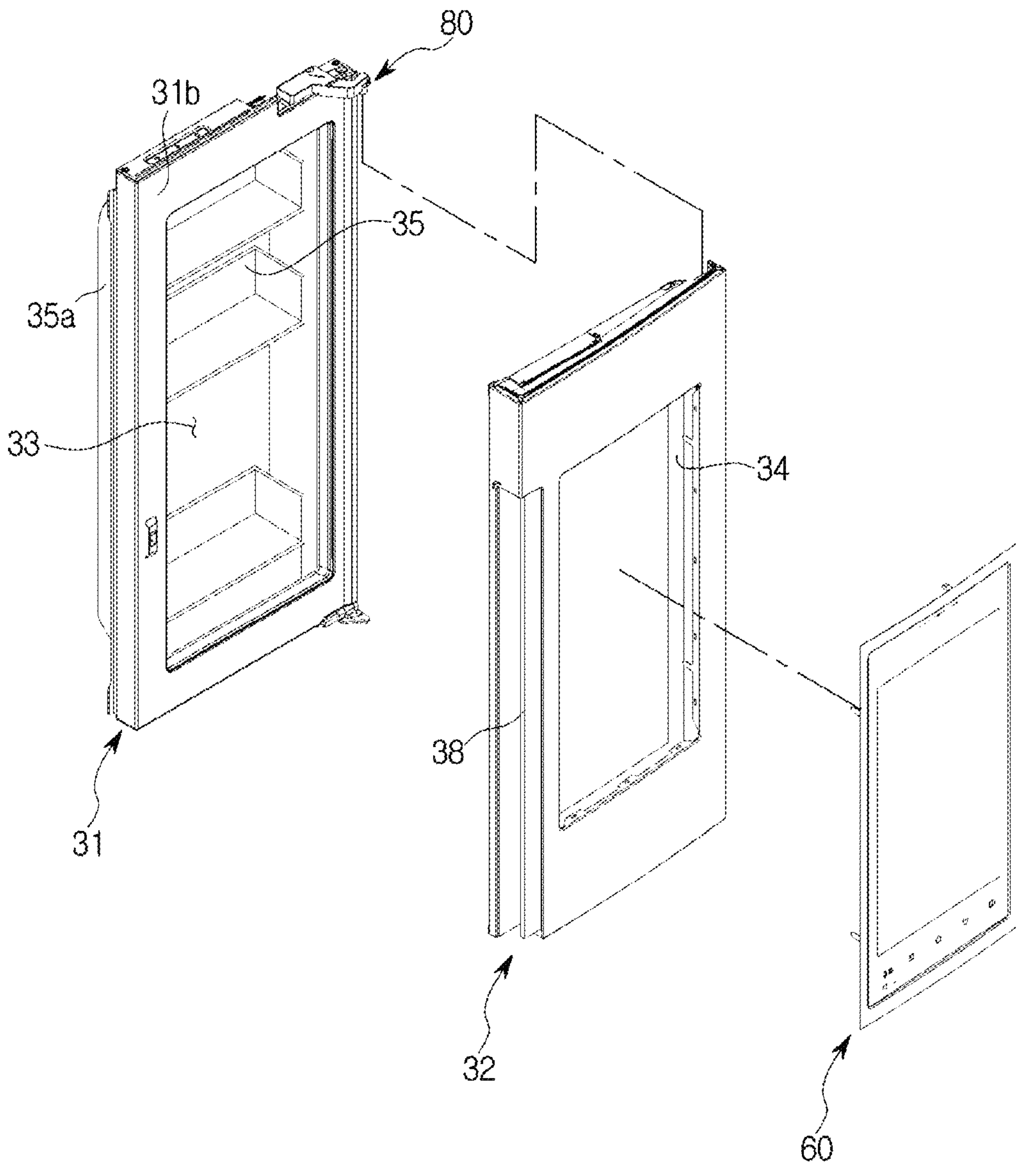
FIG. 4 is an exploded view of a door of the refrigerator according to one embodiment of the present disclosure.

FIG. 3 is an exploded view of some components of the refrigerator according to one embodiment of the present disclosure, and FIG. 4 is an exploded view of a door of the refrigerator according to one embodiment of the present disclosure.

The first door 30 may include a first inner door 31 and a first outer door 32. In the present embodiment, the second door 40 is shown to be formed as a single door, but the present disclosure is not limited thereto, and, like the first door 30, the second door 40 may be configured to be divided into a second inner door and a second outer door.

The first door 30 may include the first inner door 31 rotatably provided at the main body 10, and the first outer door 32 rotatably provided at the first inner door 31. The first outer door 32 may be configured to cover a front surface of the first inner door 31. The door shelf 35, the shelf supporter 35*a*, and the gasket 36, which are described above, may be formed at the first inner door 31. Each of an outer case 31*a* and an inner case 31*b* of the first inner door 31 may have a quadrangular frame shape, and may include a door opening 33 having an open interior. The first outer door 32 may be configured to cover the door opening 33 of the first inner door 31.

More specifically, the first outer door 32 may include a protruding door surface 39 formed on a surface of the first outer door 32 facing the first inner door 31 to protrude toward a rear side of the first outer door 32. The protruding door surface 39 is configured to correspond to the door opening 33 of the first inner door 31, and, when the first outer door 32 is placed at a position closing the first inner door 31, the protruding door surface 39 is configured to cover the door opening 33. The protruding door surface 39 may protrude toward the rear side of the first outer door 32 therefrom to allow the insulation to be easily disposed inside the first outer door 32. That is, a thickness of the first outer door 32 at a portion at which the protruding door surface 39 is disposed inside the first outer door 32 may be thicker than that of an adjacent portion thereof such that insulation performance of the first outer door 32 can be enhanced.

For convenience of the following description of the present embodiment, the first inner door 31 is referred to as an inner door 31, and the first outer door 32 is referred to as an outer door 32. Further, the following description will be made with respect to the first door 30, but the present disclosure is not limited thereto, and the following description may also be applied to the second door 40. For convenience of the following description of the present embodiment, the first door 30 is referred to as a door 30.

The refrigerator 1 may include a display device 60 having an input and output function. For convenience of a user, the display device 60 may be installed at the front surface of the door 30. A display installation portion 34 may be formed to be recessed at the front surface of the door 30 to allow the display device 60 to be installed thereon. Since the display device 60 is formed in a substantially quadrangular shape, the display installation portion 34 may also be formed in a quadrangular shape.

Figure 5:
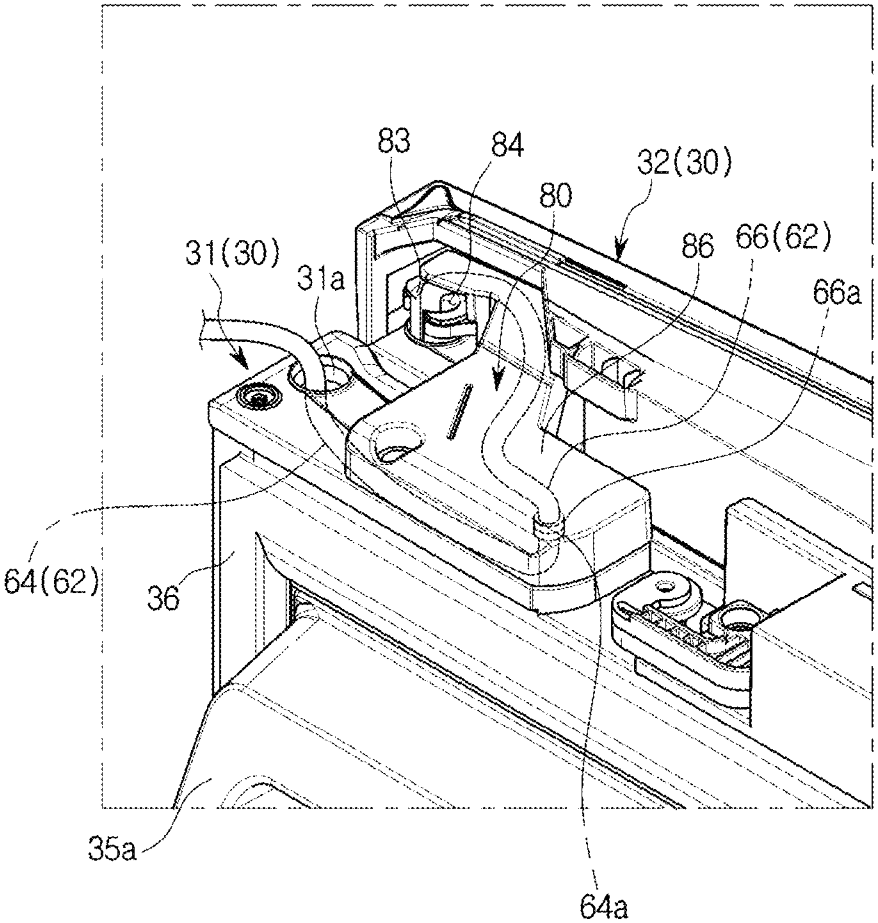
FIG. 5 is a diagram illustrating a coupling between doors of the refrigerator according to one embodiment of the present disclosure.
Figure 6:
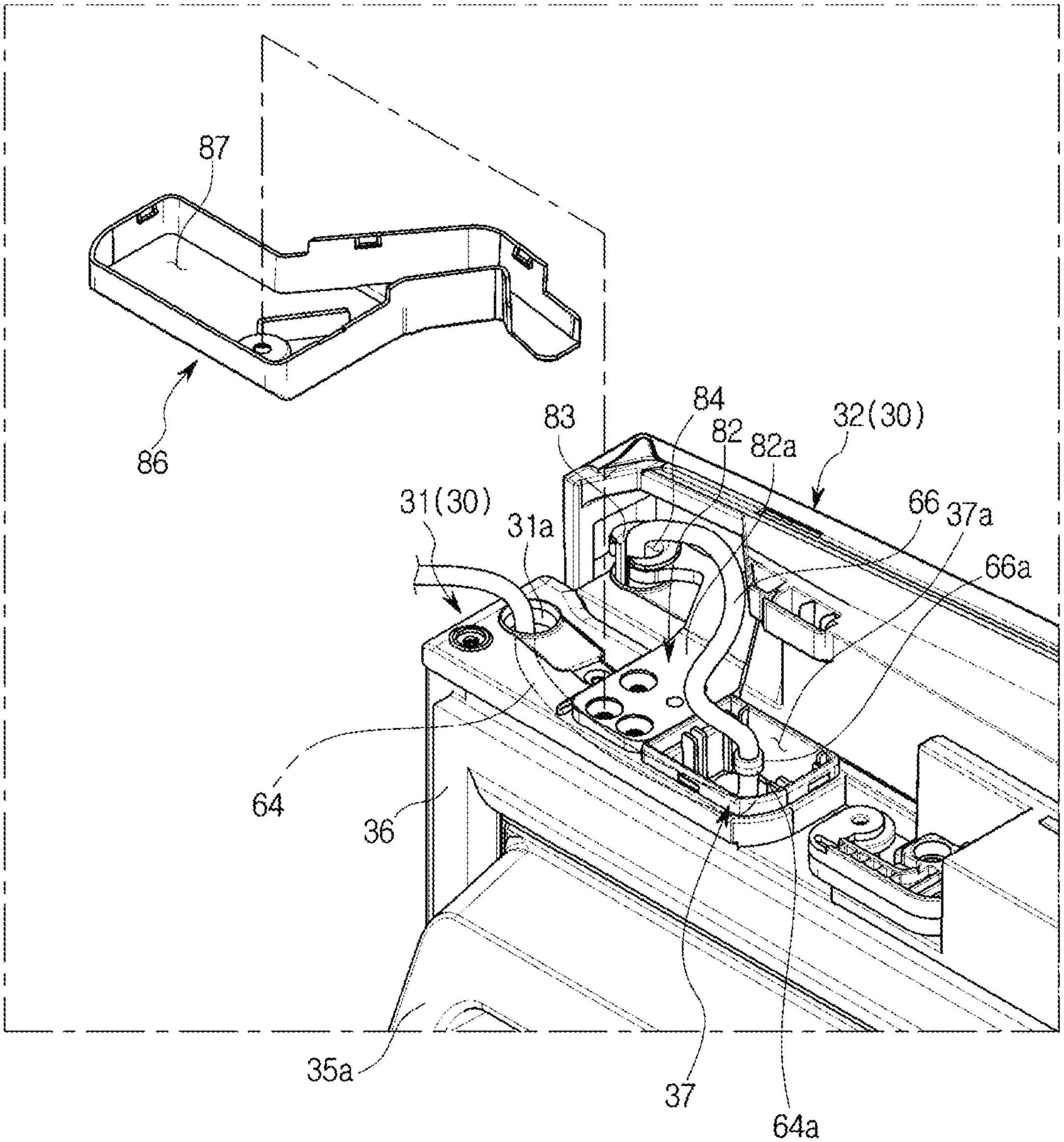
FIG. 6 is an exploded perspective view illustrating the coupling between the doors of the refrigerator according to one embodiment of the present disclosure.
Figure 7:
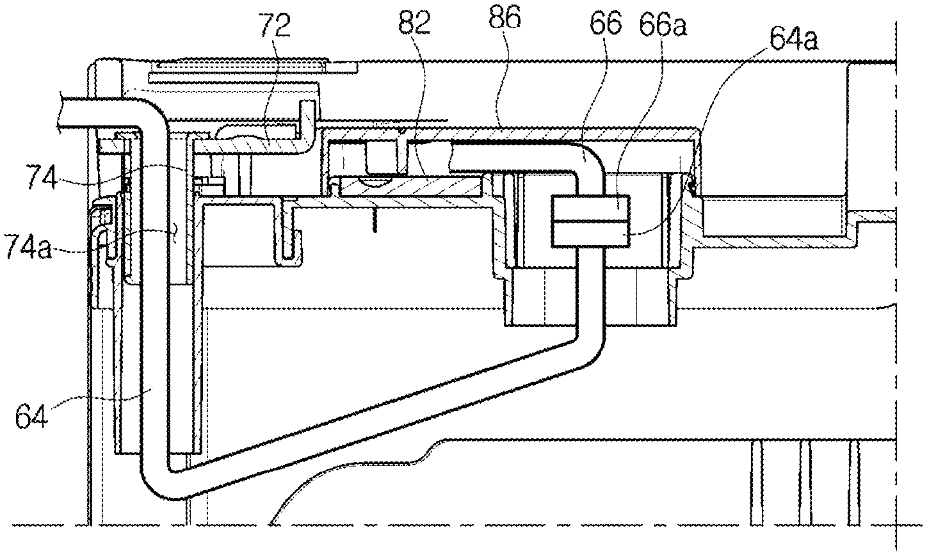
FIG. 7 is a diagram illustrating an arrangement of electric wires inside an inner door of the refrigerator according to one embodiment of the present disclosure.

FIG. 5 is a diagram illustrating a coupling between doors of the refrigerator according to one embodiment of the present disclosure, FIG. 6 is an exploded perspective view illustrating the coupling between the doors of the refrigerator according to one embodiment of the present disclosure, and FIG. 7 is a diagram illustrating an arrangement of electric wires inside an inner door of the refrigerator according to one embodiment of the present disclosure.

The refrigerator 1 may include an electric wire 62 connecting the door 30 to the main body 10 for an electronic device installed at the door 30. The electric wire 62 may include a first electric wire 64 extending from a main body electric wire 77 of the main body 10 (See, FIG. 2) to the inner door 31, and a second electric wire 66 extending from the outer door 32 to the inner door 31. The first electric wire 64 may be separably connected to the main body electric wire 77, and may be provided to pass through the inner door 31. The second electric wire 66 may be separably connected to the first electric wire 64, and may extend from the outer door 32 to the inner door 31. The first and second electric wires 64 and 66 may be referred to as an inner electric wire 64 and an outer electric wire 66, respectively. The first and second electric wires 64 and 66 may include connectors 64*a* and 66*a* configured to mutually connect the first and second electric wires 64 and 66. That is, the first and second electric wires 64 and 66 may include first and second connectors 64*a* and 66*a*, respectively.

The door 30 may include a connector seating portion 37 to connect the first and second electric wires 64 and 66. The first and second connectors 64*a* and 66*a* formed at ends of the first and second electric wires 64 and 66, respectively, may be configured to connect to each other at the connector seating portion 37. The connector seating portion 37 may be formed at an upper portion of the inner door 31 to form a seating space 37*a* at an upper surface of the inner door 31. In the seating space 37*a*, the first and second connectors 64*a* and 66*a* may be separably coupled to each other. The connector seating portion 37 may be formed to be recessed at the upper surface of the inner door 31. In the present embodiment, the connector seating portion 37 is described to be disposed at the upper surface of the inner door 31, but the present disclosure is not limited thereto, and the connector seating portion 37 may be disposed at an upper surface of the outer door 32. When the connector seating portion 37 is disposed at the upper surface of the outer door 32, the first electric wire 64 may be configured to be guided by a hinge assembly 80, which will be described below, to reach the connector seating portion 37 provided at the outer door 32.

The first electric wire 64 may be separably connected to the main body electric wire 77 of the main body 10, and may be connected to a controller (not shown) or a power supply device (not shown) that is connected to the main body electric wire 77. The first electric wire 64 may extend to the inner door 31 to be connected to the second electric wire 66.

The second electric wire 66 may be configured to be connected to an electric device installed at the outer door 32. For example, the second electric wire 66 may be connected to the display device 60 to transmit information between the display device 60 and the controller, or to supply power to the display device 60.

As the first and second electric wires 64 and 66 are connected in the connector seating portion 37 provided at the inner door 31, the outer door 32 may be easily separated from the inner door 31. That is, when the outer door 32 is separated from the inner door 31, the first and second connectors 64*a* and 66*a* of the first and second electric wires 64 and 66, which are seated in the connector seating portion 37, separate from each other such that an electrical connection may become disconnected or released and the outer door 32 may become physically separated from the inner door 31.

For convenience of description, although each of the first and second electric wires 62 are described as a single electric wire, a plurality of first and second electric wires 62 may be formed and applied.

The main body electric wire 77 and the first and second electric wires 64 and 66 may be connected in series. That is, the main body electric wire 77, the first electric wire 64, and the second electric wire 66 may be provided to be sequentially connected. The outer door 32 is provided to be separable from the inner door 31 together with the second electric wire 66, and the inner door 31 is provided to be separable from the main body 10 together with the first electric wire 64.

By disconnecting the first electric wire 64 from either the main body electric wire 77 or the second electric wire 66, the inner door 31 or the outer door 32 may be configured to be selectively separable. That is, by disconnecting the main body electric wire 77 from the first electric wire 64, the inner door 31 is in a state of being separable from the main body 10. Since the outer door 32 is coupled to the inner door 31, both the inner door 31 and the outer door 32 are in a state of being separable from the main body 10 through the above-described process. Further, by disconnecting the second electric wire 66 from the first electric wire 64, the outer door 32 is in a state of being separable from the inner door 31. With such a configuration, when the door 30 is assembled to or separated from the main body 10, assimilability of the refrigerator 1 may be improved. That is, when the door 30 is coupled to the main body 10, the inner door 31 and the outer door 32 may be sequentially coupled to the main body 10, or may be coupled to the main body 10 in a state in which the inner door 31 and the outer door 32 are coupled to each other. A separation of the door 30 from the main body 10 may be performed in an order opposite to that in which the door 30 is coupled to the main body 10.

The refrigerator 1 may include a door hinge 70 (See, FIG. 3).

The door hinge 70 may include a door hinge bracket 72, and a hinge rotating shaft 74 formed at the door hinge bracket 72. The door hinge bracket 72 is installed at the main body 10, and the door 30 is configured to be rotated relative to the hinge rotating shaft 74. More specifically, a hinge hole 31*c* corresponding to the hinge rotating shaft 74 may be formed at the inner door 31, and the hinge rotating shaft 74 may be configured to be inserted into the hinge hole 31*c* of the inner door 31 to allow the inner door 31 to be rotated on the basis of the hinge rotating shaft 74. The hinge rotating shaft 74 may be disposed to be spaced apart from the main body 10 to prevent interference therewith when the inner door 31 is rotated.

The door 30 may include the hinge assembly 80. The hinge assembly 80 may be a component of the inner door 31. The hinge assembly 80 may be connected to the connector seating portion 37, and may be configured to form a center of rotation of the outer door 32. The hinge assembly 80 may be configured to guide the second electric wire 66 from the center of rotation of the outer door 32 to the connector seating portion 37.

The hinge assembly 80 may include a hinge bracket 82. The hinge bracket 82 is provided at one door 30 of the inner door 31 and the outer door 32, and is configured to allow the other door 30 to be rotatable. In the present embodiment, the hinge bracket 82 is installed at the inner door 31, and the outer door 32 is configured to be rotated on the basis of a rotational shaft 83 formed at the hinge bracket 82. However, the present disclosure is not limited to the described above, the hinge bracket 82 may be installed at the outer door 32, and the rotational shaft 83 formed at the hinge bracket 82 may be configured to be coupled to the inner door 31 to allow the outer door 32 to be rotated relative to the inner door 31. The hinge bracket 82 may be disposed adjacent to the connector seating portion 37.

The hinge bracket 82 may include a hinge body 82*a* and the rotational shaft 83.

The hinge body 82*a* is formed to be fixed at the inner door 31 and to protrude toward the outer door 32. The hinge body 82*a* may be formed of a metal to support a weight of the outer door 32 and to stably support an operation of the outer door 32.

The rotational shaft 83 may have a hollow portion 84 and may be provided at the hinge body 82*a* to allow the outer door 32 to be rotatable. The rotational shaft 83 may be configured to be inserted into a rotational hole 32*a* of the outer door 32 (See, FIG. 3) to allow the outer door 32 to be rotated on the basis of the rotational shaft 83. The rotational shaft 83 may be disposed to be spaced apart from the inner door 31 to prevent interference therewith when the outer door 32 is rotated. That is, the hinge assembly 80 may be configured such that the rotation center of the outer door 32 is spaced apart from the inner door 31.

The outer door 32 may include an assembly insertion portion 89 formed at a surface facing the inner door 31. Since the hinge assembly 80 is provided to protrude from the inner door 31, the assembly insertion portion 89 is provided to allow the hinge assembly 80 to be inserted thereinto so the inner door 31 does not interfere with the rotation of the outer door 32.

The second electric wire 66 may be configured to pass through the hollow portion 84 of the rotational shaft 83. That is, it may be configured such that one side of the second electric wire 66 is connected to the display device 60, and the other side thereof extends to pass through the hollow portion 84 of the rotational shaft 83. Since the hinge bracket 82 is formed of a rigid body, a distance, an angle, and an arrangement between the rotational shaft 83 and the connector seating portion 37 may be kept constant even though the door 30 is being rotated. That is, even when the inner door 31 or the outer door 32 is being rotated, the distance, the angle, and the arrangement between the rotational shaft 83 and the connector seating portion 37 may be kept constant. With such a configuration, the second electric wire 66 passing through the hollow portion 84 of the rotational shaft 83 may extend to the connector seating portion 37 without being affected by a rotational movement of the door 30.

The hinge assembly 80 may include a hinge cover 86.

The hinge cover 86 may be configured to cover at least a portion of the hinge body 82*a* and cover the connector seating portion 37. The hinge cover 86 may be configured such that one side of the hinge cover 86 is open to cover the hinge bracket 82 and the connector seating portion 37. An interior of the hinge cover 86 may be recessed to form a guide space 87. The hinge cover 86 may be configured to cover at least a portion of the rotational shaft 83, cover the connector seating portion 37, and form the guide space 87 extending from the rotational shaft 83 to the connector seating portion 37. A shape of the guide space 87 formed inside the hinge assembly 80 is not limited to a particular shape, and the shape thereof may employ any configuration that prevents the second electric wire 66 from being exposed to the outside and guides the second electric wire 66 from the center of rotation of the outer door 32 to the connector seating portion 37.

The second electric wire 66 may passes through the hollow portion 84 of the rotational shaft 83, and may extend to the connector seating portion 37 through the guide space 87 formed by the hinge cover 86 and the hinge bracket 82. That is, the hinge cover 86 may guide the second electric wire 66 from the hollow portion 84 to the connector seating portion 37.

Referring to FIG. 7, the first electric wire 64 may be configured to extend from the main body 10 to pass through a hollow portion 74*a* formed in the hinge rotating shaft 74. The first electric wire 64 may pass through the hollow portion 74*a* and a lower portion of the upper surface of the inner door 31 to extend to the connector seating portion 37. The first electric wire 64 extending to the connector seating portion 37 may be connected to the second electric wire 66 extending to the connector seating portion 37.

An operation of the refrigerator 1 according to the embodiment of the present disclosure will be described below.

Figure 8:
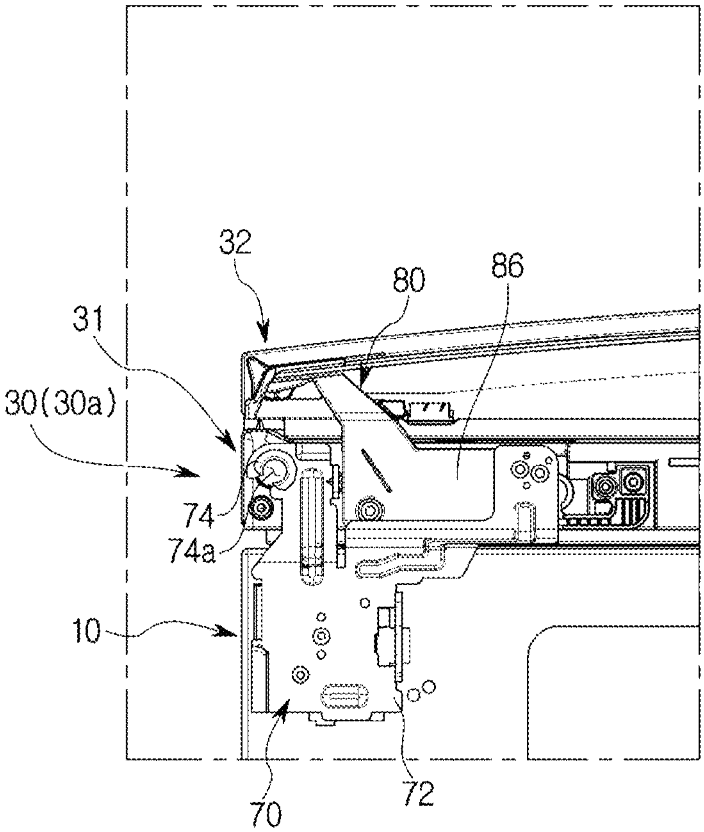
FIGS. 8, 9, and 10 are diagrams illustrating operations of the refrigerator according to one embodiment of the present disclosure.
Figure 9:
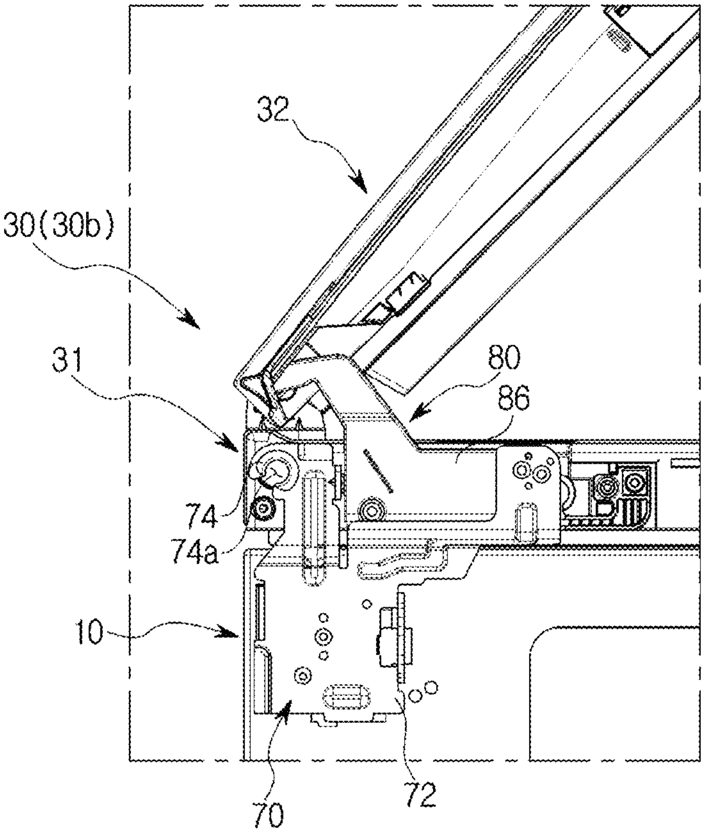
Figure 10:
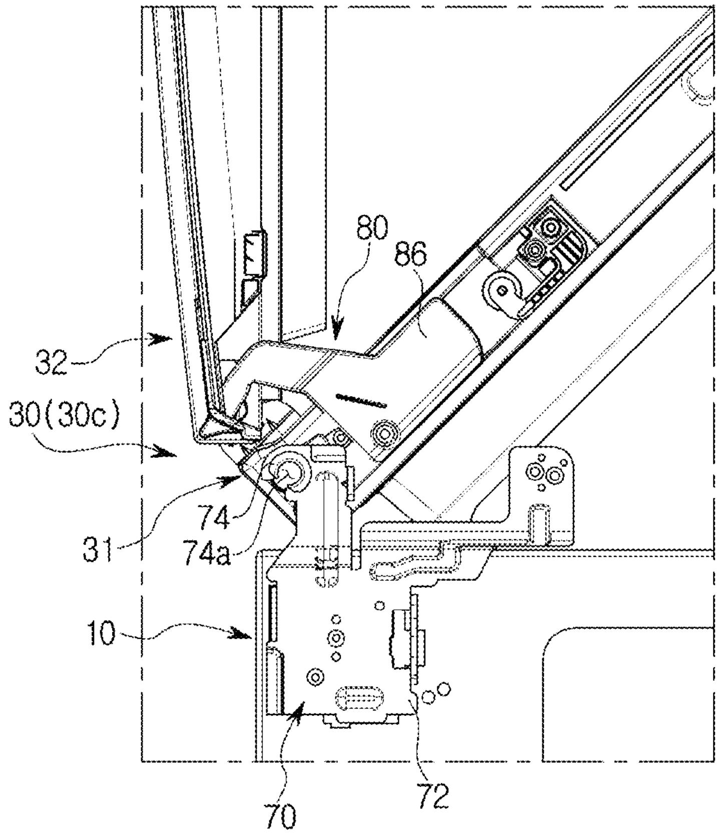

FIGS. 8, 9, and 10 are diagrams illustrating operations of the refrigerator 1 according to one embodiment of the present disclosure.

FIG. 8 illustrates a state in which both of the outer door 32 and the inner door 31 are closed, FIG. 9 illustrates a state in which the outer door 32 is opened and the inner door 31 is closed, and FIG. 10 illustrates a state in which the inner door 31 is opened with respect to the main body 10 and the outer door 32 is opened with respect to the inner door 31. Although not shown in the drawing, both of the inner door 31 and the outer door 32 may operate in an open state with respect to the main body 10. For convenience of description, a state of the door 30 in FIG. 8 may be referred to as a closed state 30*a*, a state of the door 30 in FIG. 9 may be referred to as a partially open state 30*b*, and a state of the door 30 in FIG. 10 may be referred to as an open state 30*c*. As shown in FIG. 10, in the open state 30*c* of the door 30, the inner door 31 and the outer door 32 may be separated from each other, or they may operate together in an open state with respect to the main body 10.

As shown in FIG. 8, in the closed state 30*a*, the inner door 31 is rotatably provided at the main body 10 by the door hinge 70, and the outer door 32 is rotatably provided at the inner door 31 by the hinge assembly 80.

Descriptions will be made with reference to FIG. 9. In the partially open state 30*b*, the outer door 32 is separated from the inner door 31 and is rotated on the basis of the rotational shaft 83 of the hinge assembly 80. Since the hinge assembly 80 is installed at the inner door 31, the hinge assembly 80 is fixed to the inner door 31 without moving even when the outer door 32 is rotated.

Descriptions will be made with reference to FIG. 10. In the open state 30*c*, the outer door 32 is separated from the inner door 31 and is rotated on the basis of the rotational shaft 83 of the hinge assembly 80, and the inner door 31 is separated from the main body 10 and is rotated on the basis of the hinge rotating shaft 74 of the door hinge 70. As shown in FIG. 9, since the hinge assembly 80 is installed at the inner door 31, even when the outer door 32 and the inner door 31 are rotated, the hinge assembly 80 is fixed to the inner door 31 without operation. With such a configuration, the distance, angle, and arrangement between the rotational shaft 83 of the hinge assembly 80 and the connector seating portion 37 may be kept constant even when the door 30 is being rotated, so that the second electric wire 66 extending from the rotational shaft 83 of the outer door 32 to the connector seating portion 37 may not be affected by the operation of the door 30. Further, a length of each of the first and second electric wires 64 and 66 may be kept constant while the door 30 is moved between the open state 30*c*, the closed state 30*a*, and the partially open state 30*b*. Furthermore, since the second electric wire 66 is connected to the first electric wire 64 without being affected by the operations of the outer door 32 and the inner door 31, power may be stably supplied to electronic devices installed at the outer door 32, and a signal transmission between the electronic devices and a controller may be smoothly performed. In addition, the second electric wire 66 is not affected by repetitive rotational operations of the door 30 such that durability of the second electric wire 66 can be improved.

A refrigerator according to another embodiment of the present disclosure will be described below.

Figure 11:
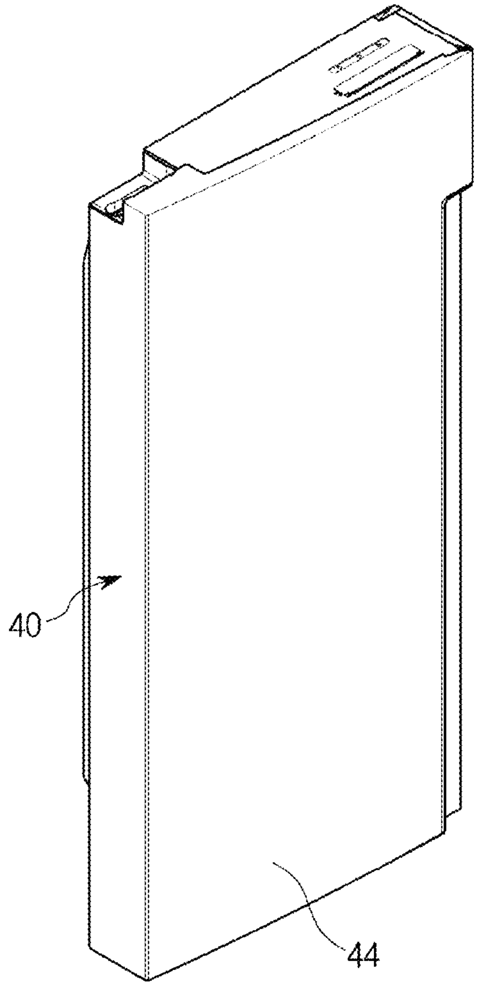
FIG. 11 is a perspective view of a door of a refrigerator according to another embodiment of the present disclosure.
Figure 12:
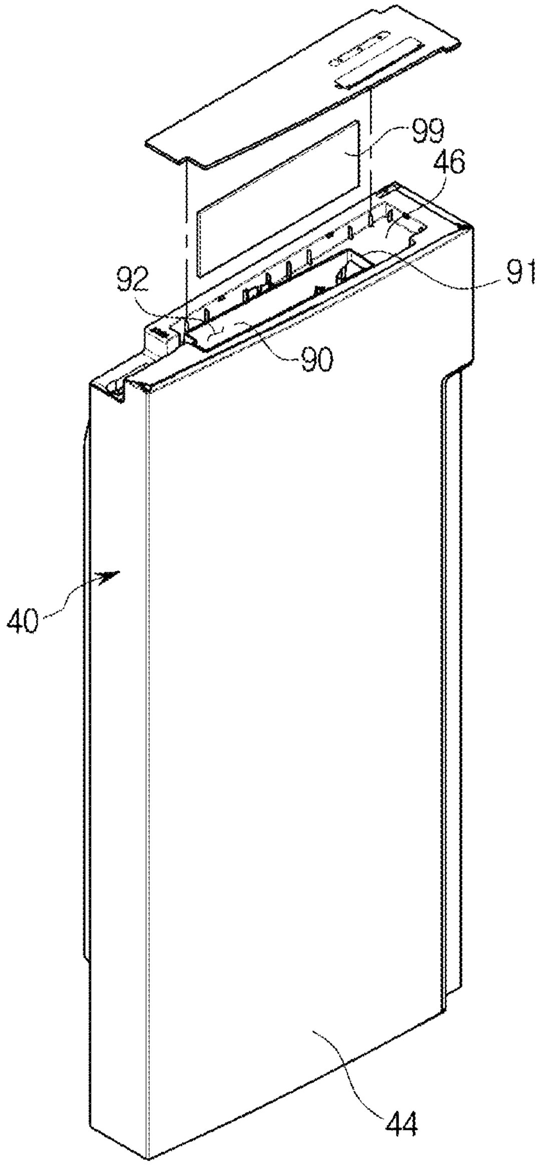
FIG. 12 is an exploded perspective view illustrating some components of the door of the refrigerator according to another embodiment of the present disclosure.
Figure 13:
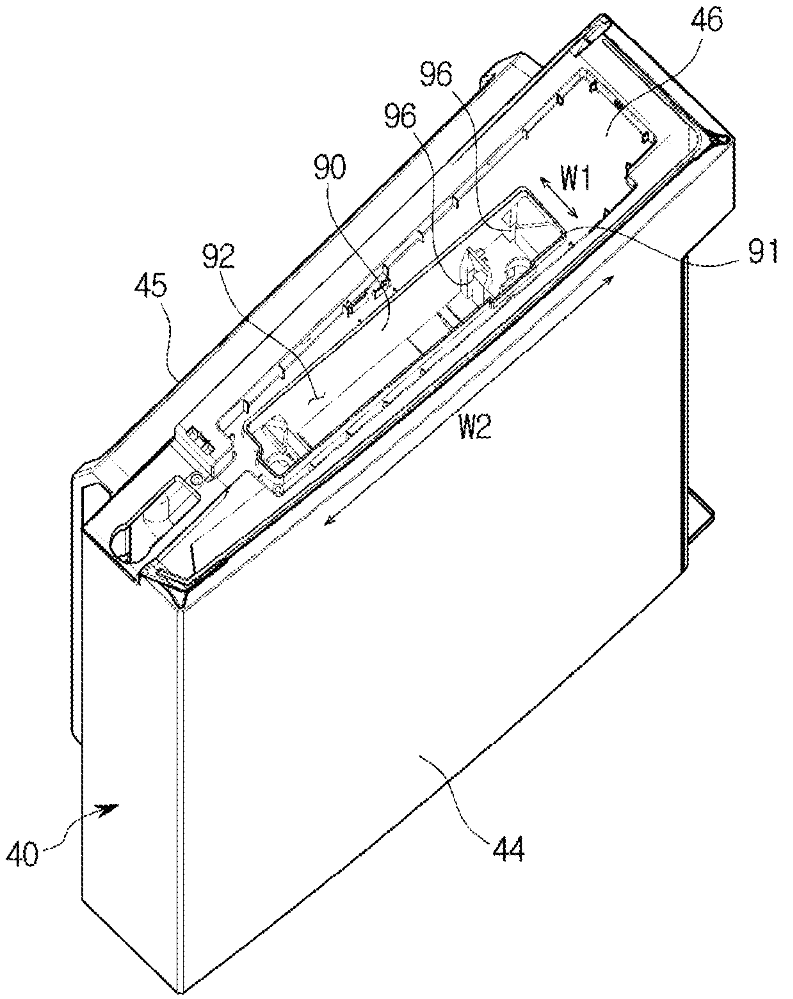
FIG. 13 is a diagram of the door of the refrigerator according to another embodiment of the present disclosure when viewed from an upper side of the door.
Figure 14:
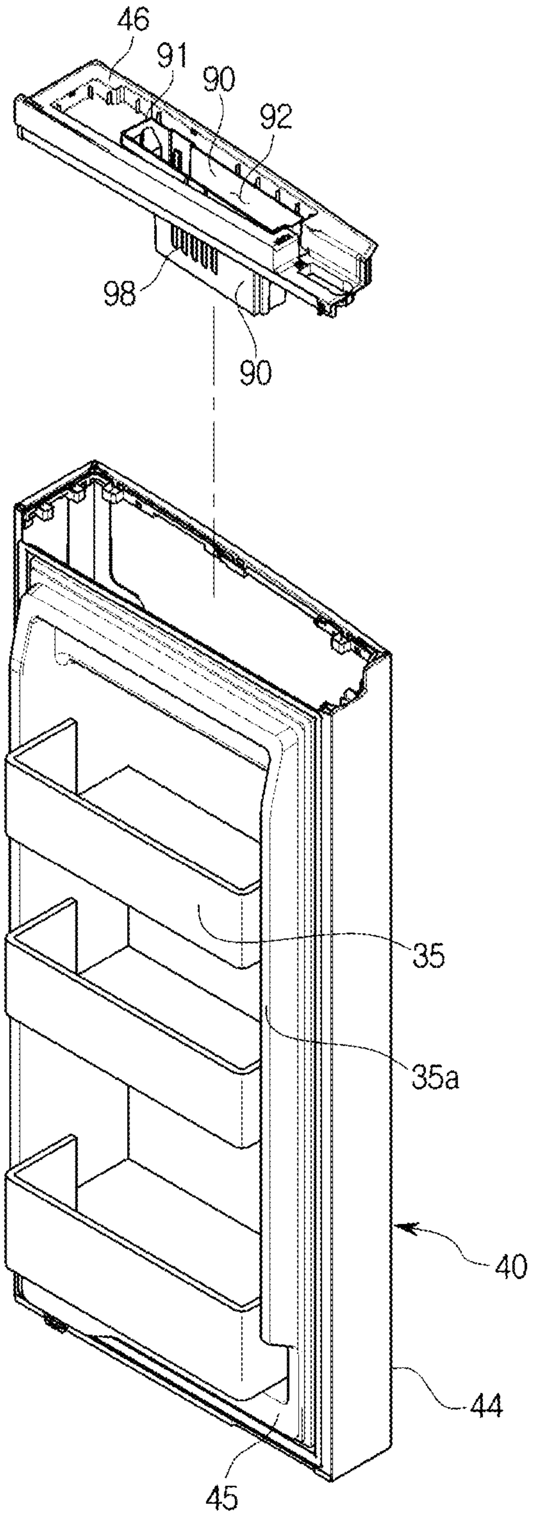
FIG. 14 is an exploded perspective view illustrating some components of the door of the refrigerator according to another embodiment of the present disclosure.

FIG. 11 is a perspective view of a door of a refrigerator according to another embodiment of the present disclosure, FIG. 12 is an exploded perspective view illustrating some components of the door of the refrigerator according to another embodiment of the present disclosure, FIG. 13 is a diagram of the door of the refrigerator according to another embodiment of the present disclosure when viewed from an upper side of the door, and FIG. 14 is an exploded perspective view illustrating some components of the door of the refrigerator according to another embodiment of the present disclosure.

A door 40 may include an installation portion 90.

The installation portion 90 may be provided to be recessed at an upper portion of the door 40 to form an installation space 92 in which a printed circuit board 99 is installed. In the present embodiment, the door 40 provided with the installation portion 90 is described as the second door 40, but the present disclosure is not limited thereto, and the installation portion 90 may be formed at the first door 30 at which the display device 60 is installed. For convenience of the following description of the embodiment, the second door 40 is referred to as the door 40.

The installation portion 90 may be formed at the upper portion of the door 40. The installation portion 90 may be configured to form a body of the door 40 at the upper portion thereof together with an outer door case 44 and an inner door case 45 of the door 40. The installation portion 90 may be formed at an upper surface plate 46 forming an upper surface of the door 40. The installation portion 90 may be integrally formed with the upper surface plate 46. However, the present disclosure is not limited thereto, and the installation portion 90 may also be formed as a separate configuration from the upper surface plate 46.

The installation portion 90 may include a rim portion 91 formed along a rim of the installation portion 90 and formed to be higher than an upper surface of an adjacent upper surface plate 46. The rim portion 91 may be formed to be higher than the upper surface of an adjacent door 40 such that water, which may be accumulated on the upper surface of the upper surface plate 46, may be prevented from flowing into the installation space 92.

As described above, the installation portion 90 may be formed to be recessed from the upper surface of the door 40 to form the installation space 92. The installation portion 90 may be configured such that an opening is formed at one side of the installation portion 90 to allow the printed circuit board 99 to be inserted thereinto and withdrawn therefrom.

The installation portion 90 may be formed such that a width in a second direction W2, which is the left-right direction of the door 40, is larger than that in a first direction W1, which is the front-rear direction of the door 40. That is, the installation space 92 may be configured such that the width in the second direction W2 is larger than that in the first direction W1.

The installation portion 90 may include a guide rail 96 formed in a depth direction of the installation space 92. The guide rail 96 may be formed in the depth direction of the installation space 92, and may be formed to be recessed on an inner surface of a body of the installation portion 90. When the printed circuit board 99 is installed at the installation portion 90, the guide rail 96 is configured to guide insertion of the printed circuit board 99.

The printed circuit board 99 may have a substantially plate shape. The installation portion 90 has the above-described configuration so that the printed circuit board 99 is inserted into the door 40 in parallel with front and rear surfaces of the door 40, and a dimension of the printed circuit board 99 may not be limited by a width in the front-rear direction of the door 40.

The installation portion 90 may include a reinforcing rib 98.

The reinforcing rib 98 may be formed on an outer surface of the body of the installation portion 90. At least one reinforcing rib 98 may be provided on the outer surface of the body of the installation portion 90. In the present embodiment, a plurality of reinforcing ribs 98 are disposed to be spaced apart from one another and to be in parallel therewith. The reinforcing rib 98 may connect a lower surface of the upper surface plate 46 of the door 40 to the outer surface of the installation portion 90 such that durability of the installation portion 90 can be improved. The present disclosure is not limited to the description above, and the reinforcing rib 98 may be formed on only the outer surface of the installation portion 90 irrespective of the upper surface plate 46. A foaming agent for insulation of the door 40 is impregnated into an interior formed by the installation portion 90, the upper surface plate 46, the outer case 14, and the inner case 12, and the reinforcing rib 98 may prevent deformation of the installation portion 90 caused by an impregnation pressure.

The installation portion 90 forms the body of the door 40 in association with the upper surface plate 46, and the outer door case 44, and the inner door case 45 of the door 40.

A refrigerator according to another still another embodiment of the present disclosure will be described below.

Figure 15:
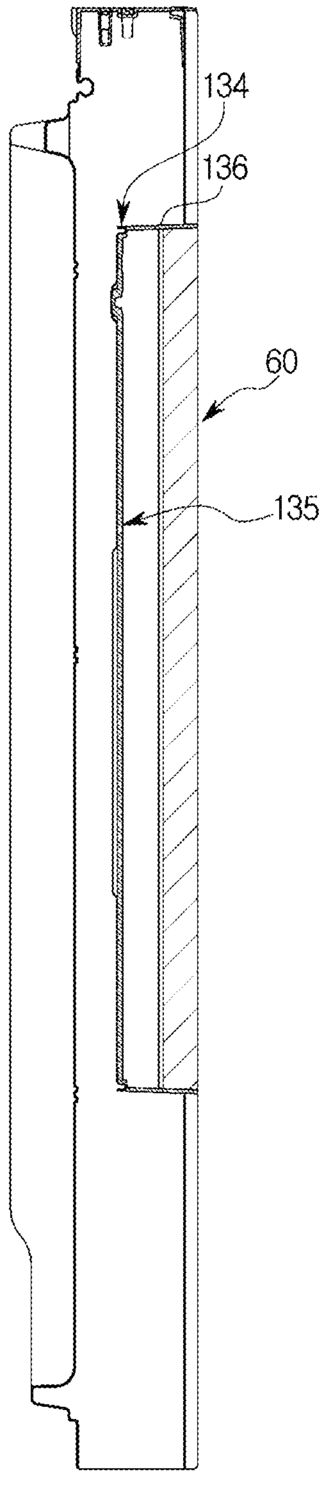
FIG. 15 is a cross-sectional view of a door of a refrigerator according to still another embodiment of the present disclosure.
Figure 16:
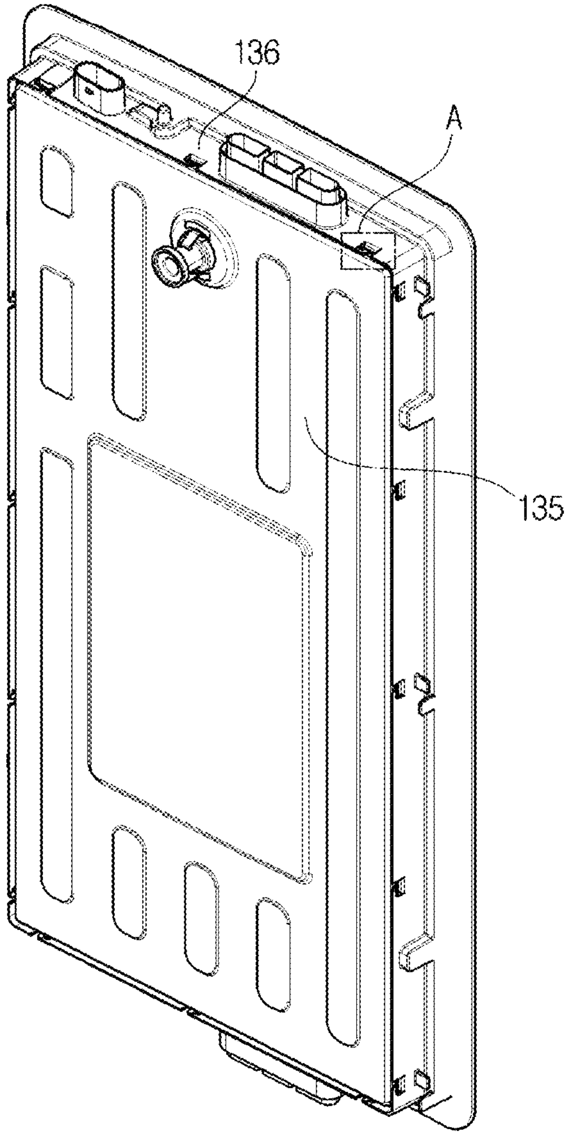
FIG. 16 is a perspective view of some components of the door of the refrigerator according to still another embodiment of the present disclosure.
Figure 17:
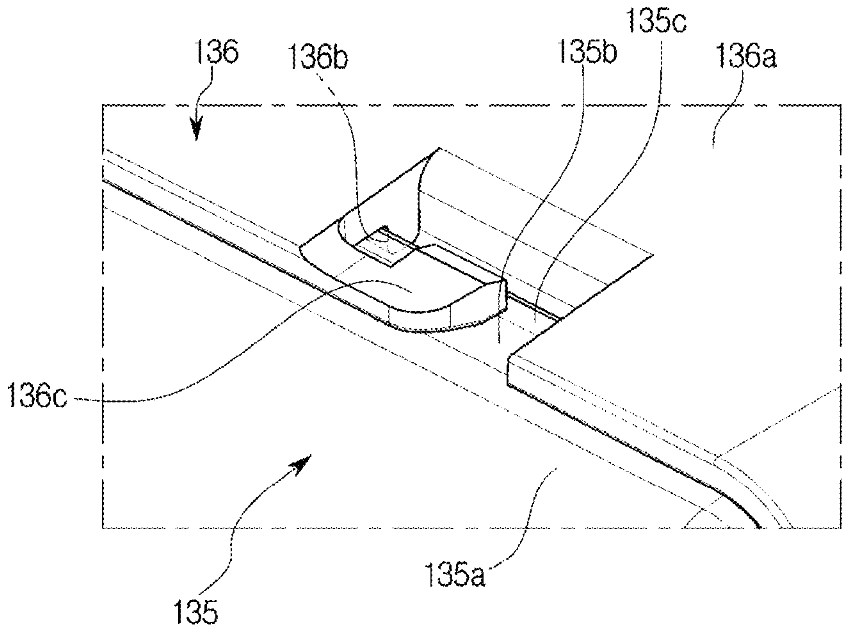
FIG. 17 is an enlarged view of a portion A in FIG. 16.
Figure 18:
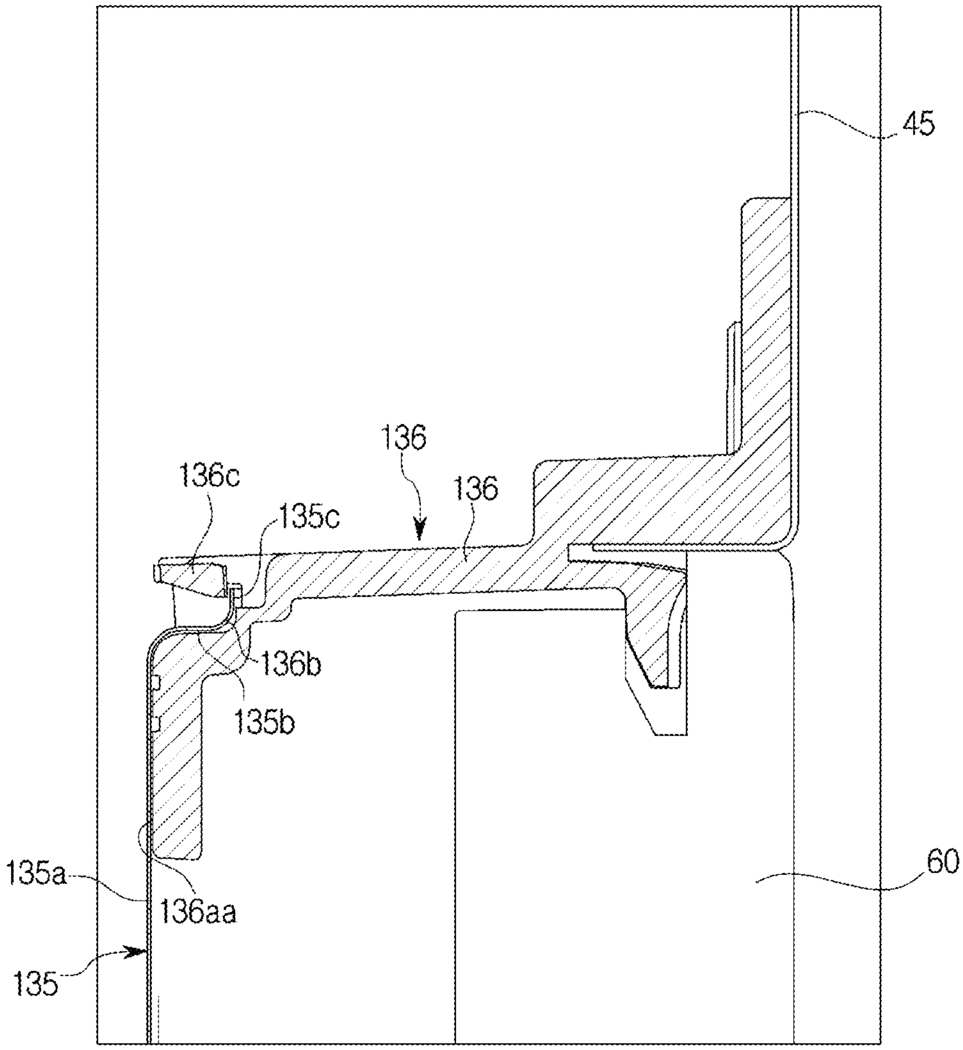
FIG. 18 is a partial cross-sectional view of the door of the refrigerator according to still another embodiment of the present disclosure.

FIG. 15 is a cross-sectional view of a door of a refrigerator according to still another embodiment of the present disclosure, FIG. 16 is a perspective view of some components of the door of the refrigerator according to still another embodiment of the present disclosure, FIG. 17 is an enlarged view of a portion A in FIG. 16, and FIG. 18 is a partial cross-sectional view of the door of the refrigerator according to still another embodiment of the present disclosure.

A refrigerator 1 may include a display device 60 having an input and output function. For user convenience, the display device 60 may be installed at a front surface of a door 30. A display installation portion 134 may be formed to be recessed at the front surface of the door 30 to allow the display device 60 to be installed thereon. Since the display device 60 is formed in a substantially quadrangular shape, the display installation portion 134 may also be formed in a quadrangular shape.

The display installation portion 134 may include a heat dissipator 135 facing a rear surface of the display device 60 and configured to dissipate heat generated in the display device 60. The heat dissipator 135 may be provided to have a dimension corresponding to the rear surface of the display device 60. The heat dissipator 135 may form a gap between the display device 60 and the heat dissipator 135.

The display device 60 generates heat while performing the input and output function, and the heat dissipator 135 receives and dissipates the heat generated from the display device 60 by spreading the heat to the entire door 30. The heat dissipator 135 may be formed of a metal.

A display installation portion 34 may include an installation case 136 coupled to a rim of the heat dissipator 135 and forming a depth of an installation space of the display installation portion 34. The installation case 136 may be formed by injection molding, and the heat dissipator 135 may be formed by press molding.

In the present embodiment, the installation case 136 and the heat dissipator 135 are formed as separate configurations, but the installation case 136 and the heat dissipator 135 may be integrally formed. Further, both of the installation case 136 and the heat dissipator 135 may be formed of metals.

The heat dissipator 135 includes a unit body **135*a* corresponding to the rear surface of the display device 60 and a unit rim portion 135*b* provided at a rim of the unit body 135*a* and coupled to the installation case 136. The unit body 135*a*** may be formed in an embossed shape for strength reinforcement.

The unit rim portion **135*b* may be formed to be bent from the unit body 135*a* at the rim of the unit body 135*a*. The unit rim portion 135*b* may be bent from the unit body 135*a* toward the rear surface of the display device 60**.

The heat dissipator 135 may include a unit fixer **135*c* configured to be bent outward from the unit rim portion 135*b*. The unit fixer 135*c* is configured to be fixed by a unit stopper 136*b* and a case holder 136*c* of the installation case 136, which will be described below. The unit fixer 135*c* may be formed along at least a portion of the rim of the unit body 135*a***.

The installation case 136 may include a case body **136*a*, the unit stopper 136*b*, and the case holder 136*c***.

The case body **136*a* is configured to be coupled to the rim of the heat dissipator 135 and to form the depth of the display installation portion 134. The case body 136*a* may include a unit seating surface 136*aa* on which the heat dissipator 135 is seated. The unit seating surface 136*aa* may be configured to be in contact with at least a portion of a front surface of the heat dissipator 135. Further, the unit seating surface 136*aa* may be formed along at least a portion of the rim of the heat dissipator 135, and, when the heat dissipator 135 is installed at the installation case 136, the unit seating surface 136*aa* may be configured to prevent deformation of the installation position of the heat dissipator 135. At least a portion of the front surface of the heat dissipator 135 is in contact with and is seated on the unit seating surface 136*aa* so that the unit seating surface 136*aa* may serve as a stopper configured to restrict a movement of the heat dissipator 135 toward the display device 60**.

The unit stopper **136*b* is configured to be provided on the installation case 136 to restrict a movement of the heat dissipator 135 so as to prevent the heat dissipator 135 from being moved in a direction toward the display device 60**.

The case holder **136*c* is formed to extend from the installation case 136 and to restrict the movement of the heat dissipator 135 so as to prevent the heat dissipator 135 from being moved in a direction away from the display device 60. That is, the unit stopper 136*b* is configured to restrict the movement of the heat dissipator 135 in the front direction, and the case holder 136*c* is configured to restrict the movement of the heat dissipator 135 in the rear direction. The case holder 136*c* may elastically operate. That is, while the heat dissipator 135 is seated on the unit seating surface 136*aa*, the unit rim portion 135*b* or the unit fixer 135*c* elastically pressurizes the case holder 136*c*. When the heat dissipator 135 has been seated on the unit seating surface 136*aa*, the case holder 136*c* elastically returns to its original position to restrict a movement of the unit fixer 135*c***.

With such a configuration, the heat dissipator 135 may be coupled to the installation case 136 without a separate engagement structure, and the heat dissipator 135 may be configured not to escape from the installation case 136. Alternatively, a separate engagement structure such as a screw coupling may be added for a coupling of the heat dissipator 135 and the installation case 136.

A refrigerator according to yet another embodiment of the present disclosure will be described below. Description of a configuration overlapping with the above-described configurations will be omitted.

Figure 19:
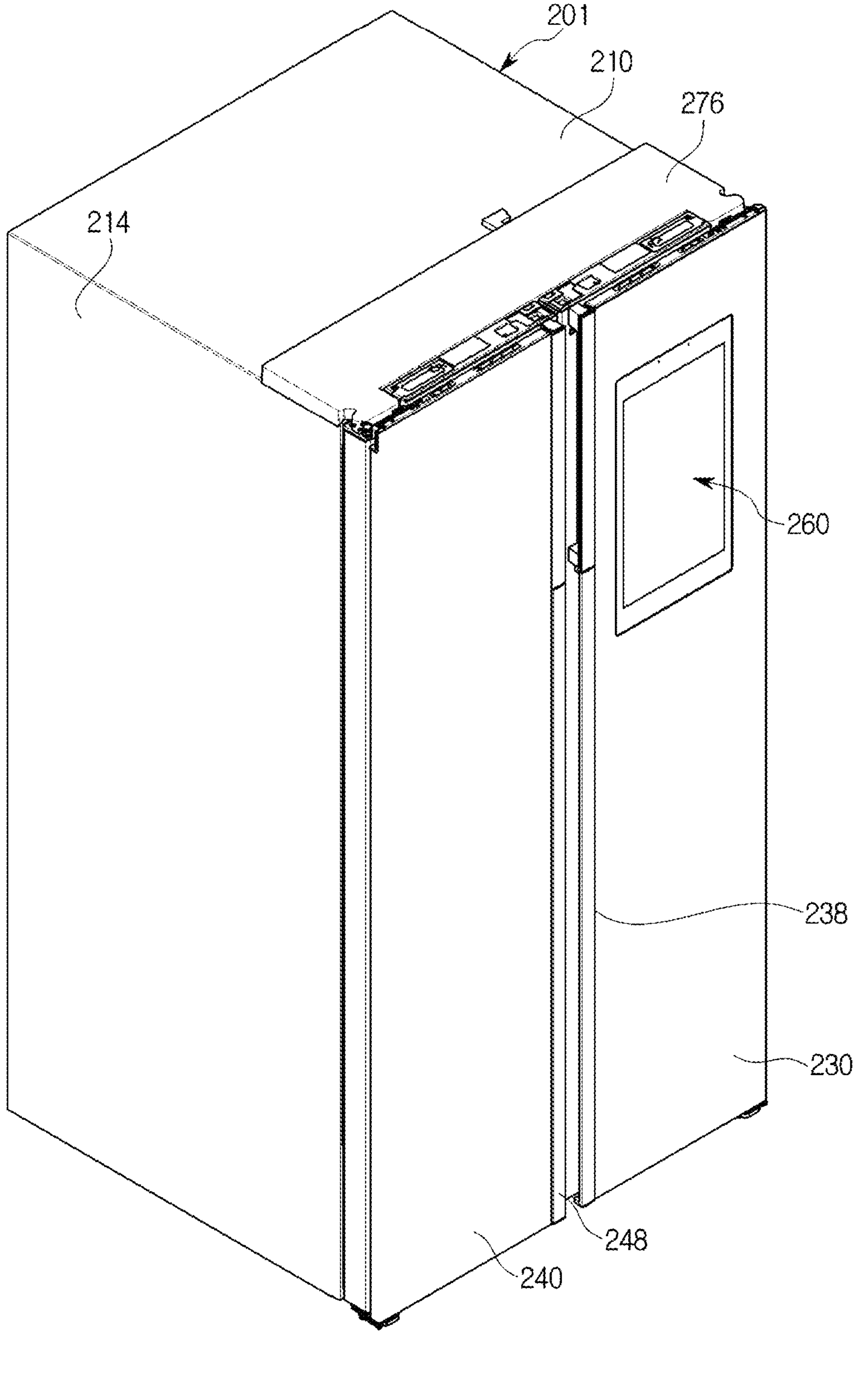
FIG. 19 is a perspective view of the refrigerator according to yet another embodiment of the present disclosure.
Figure 20:
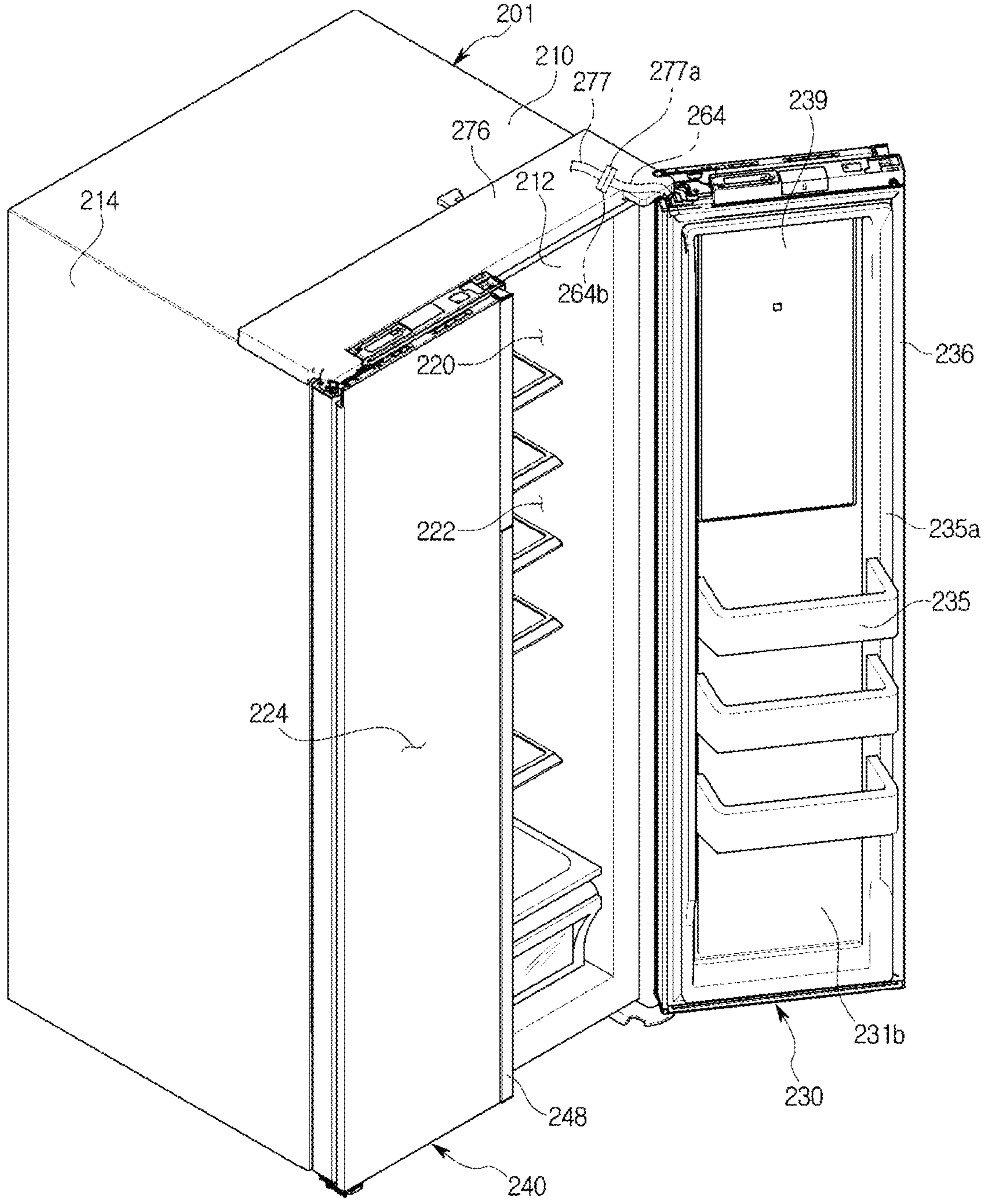
FIG. 20 is a perspective view illustrating a state in which the door of the refrigerator according to yet another embodiment of the present disclosure is opened.

FIG. 19 is a perspective view of a refrigerator according to yet another embodiment of the present disclosure, and FIG. 20 is a perspective view illustrating a state in which the door of the refrigerator according to yet another embodiment of the present disclosure is opened.

A refrigerator 201 includes a main body 210, a storage compartment 220 formed inside the main body 210 and comparted into upper and lower portions, a door 230 configured to open and close the storage compartment 220, and a cold air supply device (not shown) configured to supply cold air to the storage compartment 220.

The main body 210 may include an inner case 212 configured to form the storage compartment 220, an outer case 214 connected to the outside of the inner case 212 to form an exterior of the main body 210, and insulation (not shown) to be foamed between the inner case 212 and the outer case 214 to insulate the storage compartment 220.

The storage compartment 220 may be provided to have an open front surface, and may be comparted into a refrigerating compartment 222 at one side of the storage compartment 220 and a freezing compartment 224 at the other side thereof by a vertical partition (not shown). Positions of the refrigerating compartment 222 and the freezing compartment 224 are not limited, and, for convenience of description, the left side may be referred to as the freezing compartment 224 and the right side may be referred to as the refrigerating compartment 222 on the basis of a view from a front of the refrigerator 201. The refrigerating compartment 222 and the freezing compartment 224 may be opened and closed by the doors 230 that are rotatably coupled to the main body 210.

A pair of doors 230 may be disposed at the left and right sides, respectively. For convenience of description, a right door in the drawing is referred to as a first door 230, and a left door is referred to as a second door 240. A first door handle 238 is grippably provided at the first door 230 to open and close the first door 230, and a second door handle 248 is grippably provided at the second door 240 to open and close the second door 240.

A door shelf 235 may include a shelf supporter 235*a* extending vertically from each of the first and second doors 230 and 240 to support the door shelf 235 at left and right sides thereof. The shelf supporter 235*a* may be separably provided to each of the first and second doors 230 and 240 as a separate configuration, and, in the present embodiment, the shelf supporter 235*a* is provided to be formed to extend from each of the first and second doors 230 and 240.

Further, a gasket 236 may be provided at an edge of the rear surface of each of the first door 230 and the second door 240 to seal a gap between the main body 210 and the first and second doors 230 and 240 in a state in which the first and second doors 230 and 240 are closed.

The gasket 236 may be installed in a form of a loop along the edge of the rear surface of each of the first door 230 and the second door 240, and a magnet (not shown) may be include inside the gasket 236.

Figure 21:
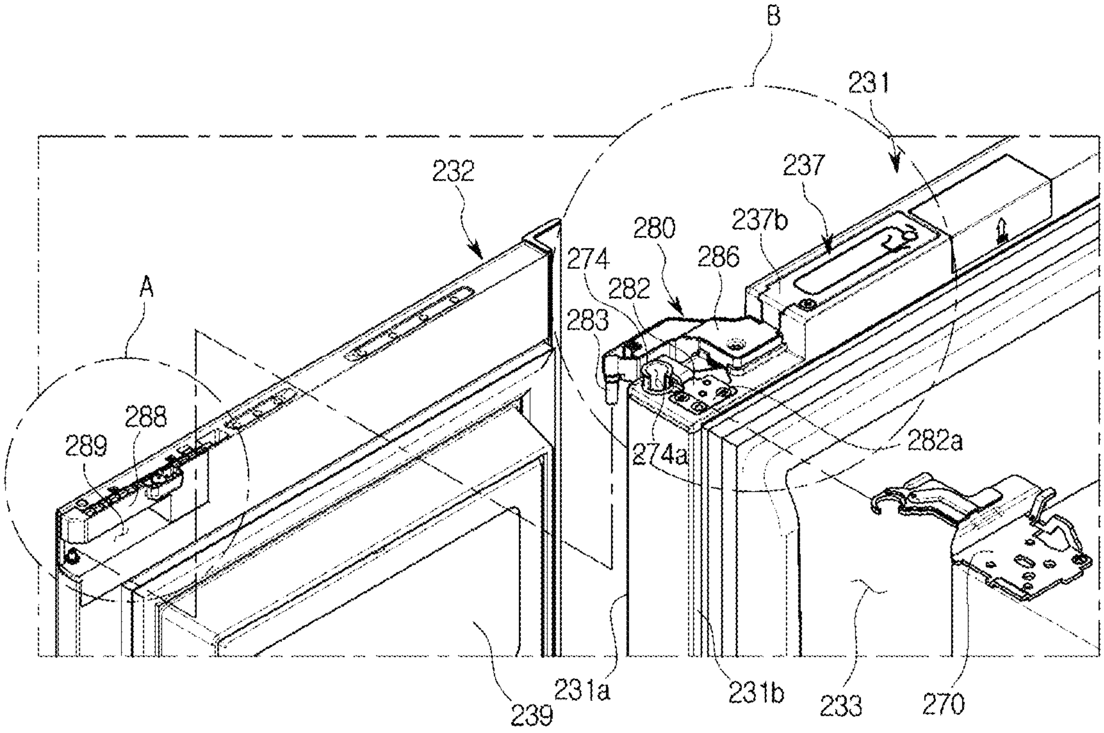
FIGS. 21 and 22 are exploded views of some components of the refrigerator according to yet another embodiment of the present disclosure.
Figure 22:
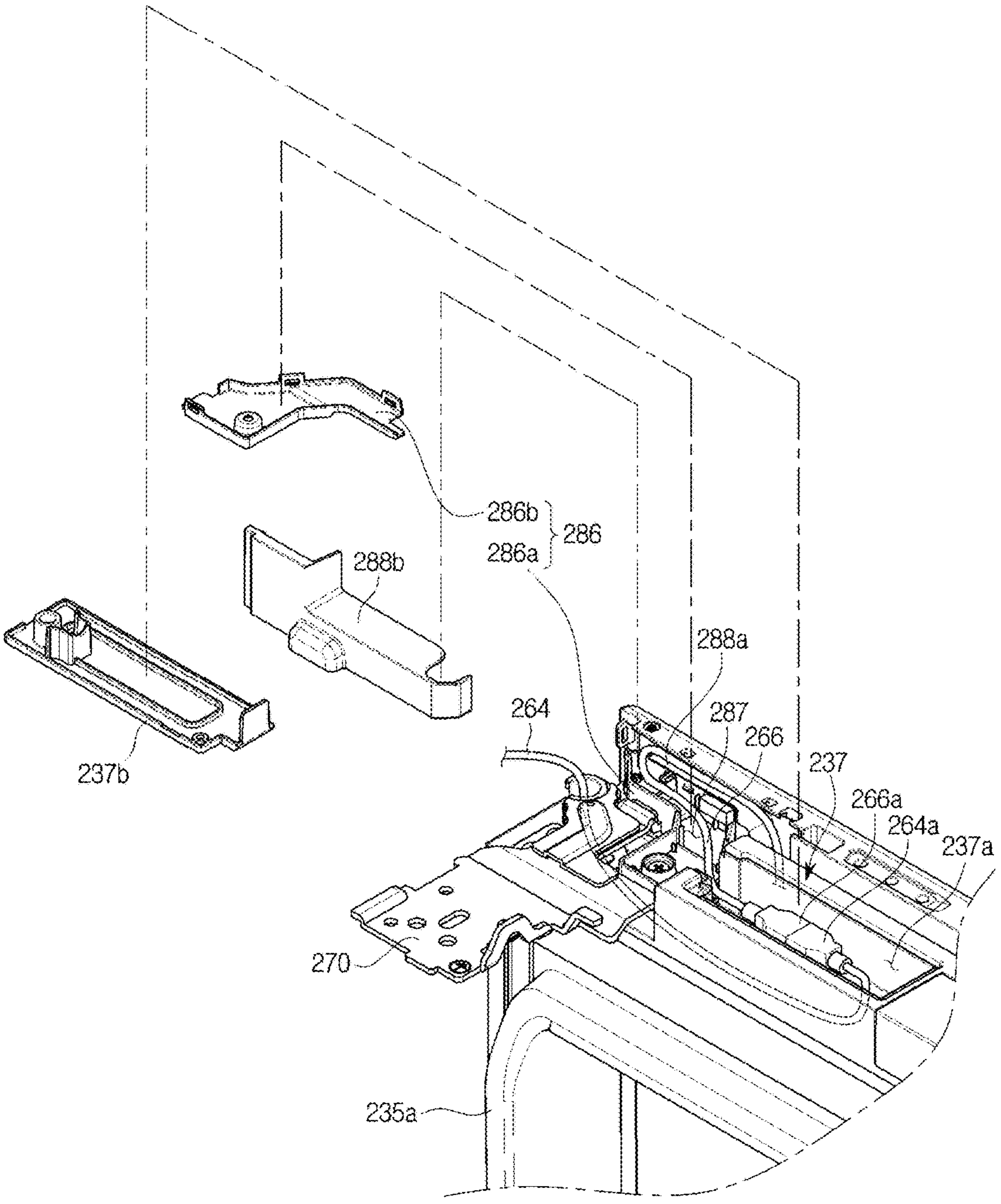

FIGS. 21 and 22 are exploded views of some components of the refrigerator 201 according to yet another embodiment of the present disclosure.

The first door 230 may include a first inner door 231 and a first outer door 232. In the present embodiment, the second door 240 is shown to be formed as a single door, but the present disclosure is not limited thereto, and, like the first door 230, the second door 40 may be configured to be divided into a second inner door and a second outer door.

The first door 230 may include the first inner door 231 rotatably provided at the main body 210 and include the first outer door 232 rotatably provided at the first inner door 231. The first outer door 232 may be configured to cover a front surface of the first inner door 231. The door shelf 235, the shelf supporter 235*a*, and the gasket 236, which are described above, may be formed at the first inner door 231. Each of an outer case 231*a* and an inner case 231*b* of the first inner door 231 may have a quadrangular frame shape and a door opening having an open interior. The first outer door 232 may be configured to cover the door opening of the first inner door 231.

More specifically, the first outer door 232 may include a protruding door surface 239 formed on a surface of the first outer door 32 facing the first inner door 231 to protrude toward a rear side of the first outer door 32. The protruding door surface 239 is configured to correspond to the door opening of the first inner door 231, and the protruding door surface 239 is configured to cover the door opening when the first outer door 232 is placed at a position closing the first inner door 231. The protruding door surface 239 may protrude toward the rear side of the first outer door 232 therefrom to allow the insulation to be easily disposed inside the first outer door 232. That is, a thickness of the first outer door 232 at a portion at which the protruding door surface 239 is disposed inside the first outer door 232 may be thicker than that of an adjacent portion thereof such that insulation performance of the first outer door 232 can be enhanced.

For convenience of the following description of the present embodiment, the first inner door 231 is referred to as an inner door 231, and the first outer door 232 is referred to as an outer door 232. Further, the following description will be made with respect to the first door 230, but the present disclosure is not limited thereto, and the following description may also be applied to the second door 240. For convenience of the following description of the present embodiment, the first door 230 is referred to as a door 230.

Figure 23:
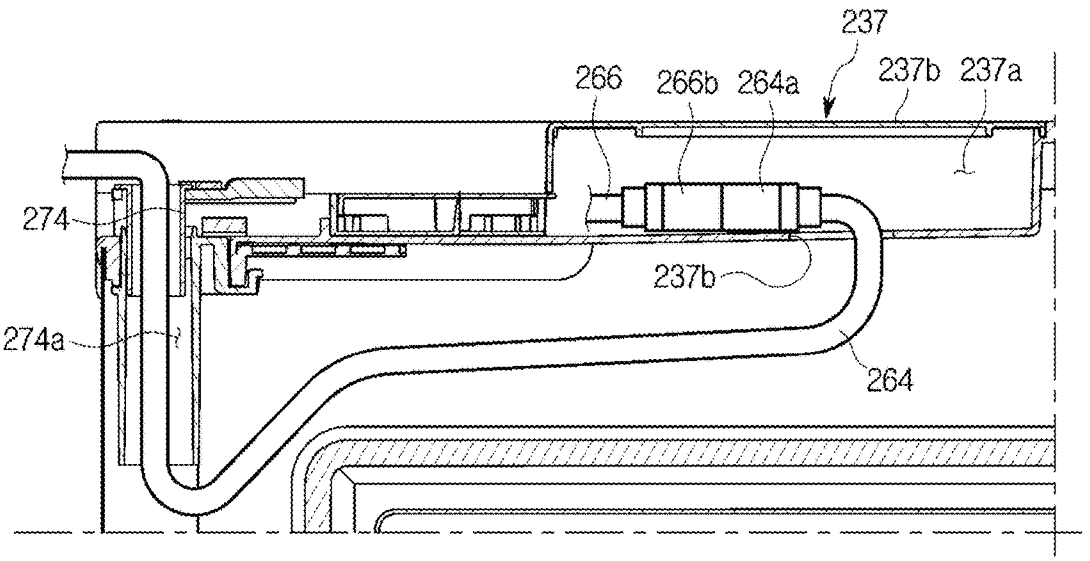
FIG. 23 is a diagram illustrating an arrangement of electric wires inside an inner door of the refrigerator according to yet another embodiment of the present disclosure.
Figure 24:
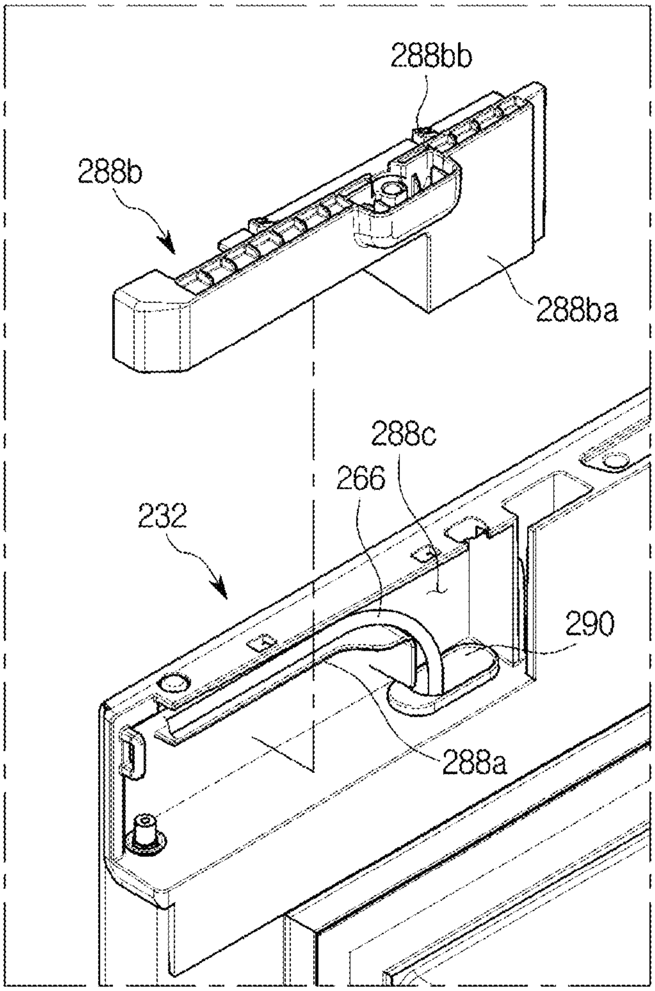
FIG. 24 is an enlarged view of a portion A in FIG. 21.
Figure 25:
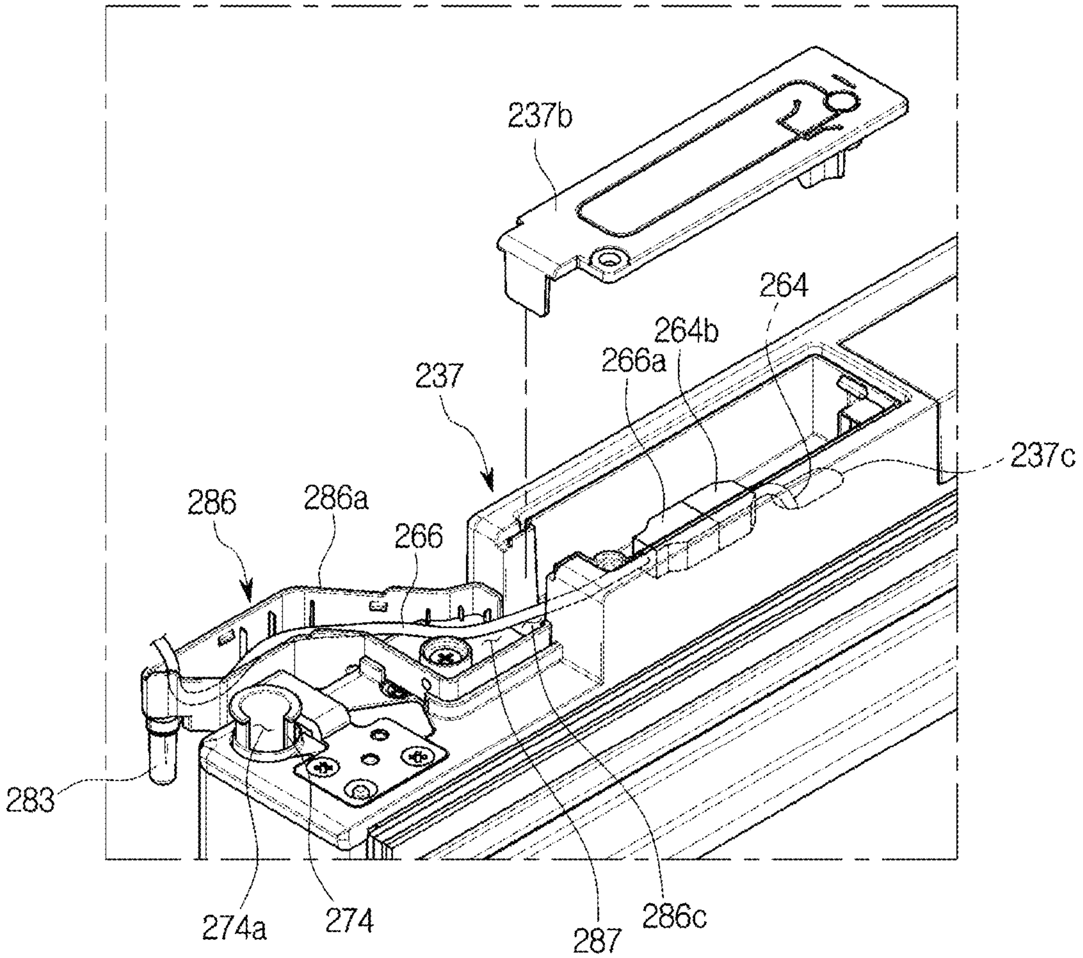
FIG. 25 is an enlarged view of a portion B in FIG. 21.
Figure 26:
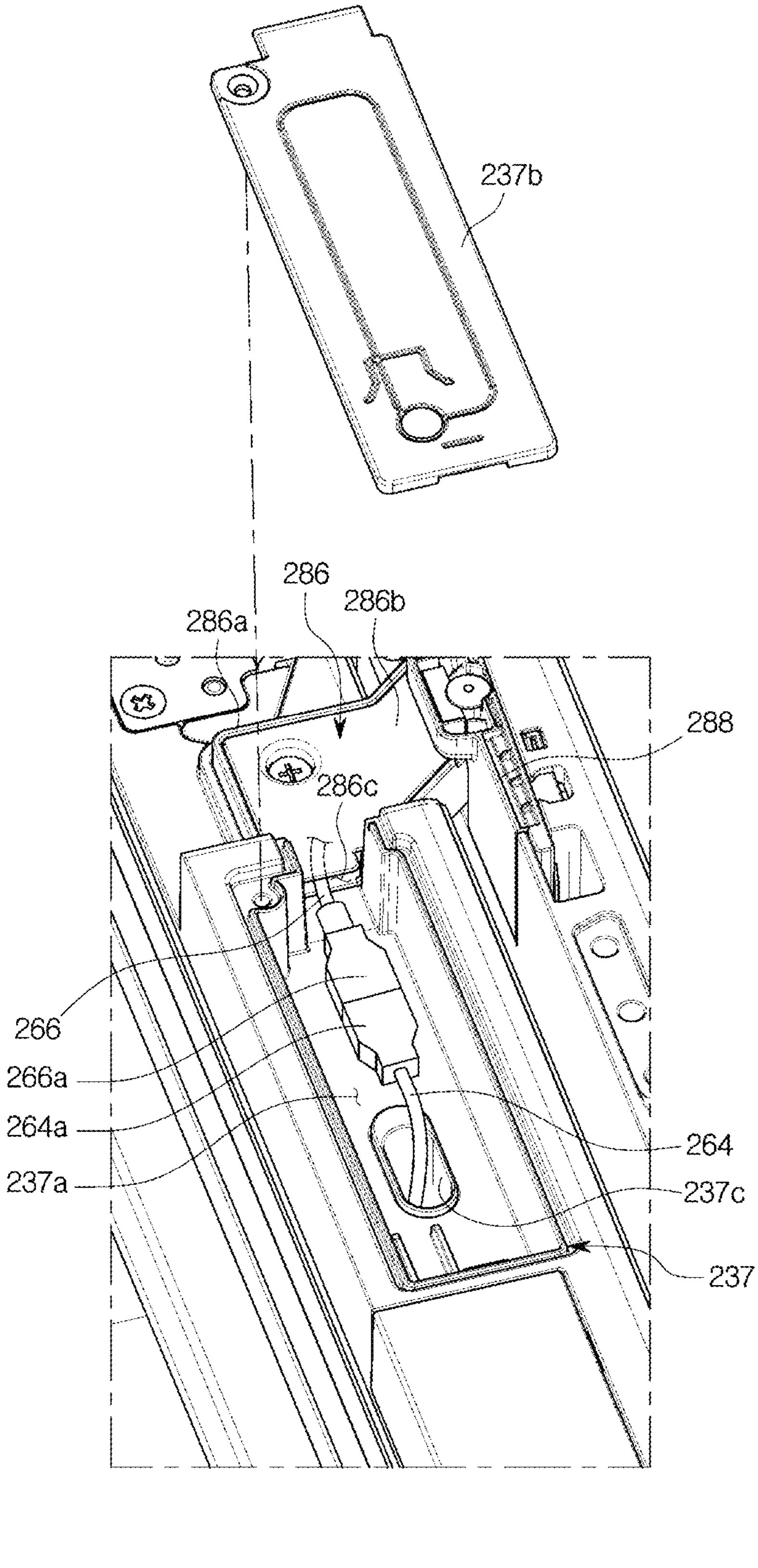
FIG. 26 is an enlarged view of a connector seating portion and an electric wire guide of the refrigerator according to yet another embodiment of the present disclosure.

FIG. 23 is a diagram illustrating an arrangement of electric wires inside an inner door of the refrigerator according to yet another embodiment of the present disclosure, FIG. 24 is an enlarged view of a portion A in FIG. 21, FIG. 25 is an enlarged view of a portion B in FIG. 21, and FIG. 26 is an enlarged view of a connector seating portion and an electric wire guide of the refrigerator according to yet another embodiment of the present disclosure.

The refrigerator 201 may include an electric wire connecting the door 230 to the main body 210 for an electronic device installed at the door 230. The electric wire may include a first electric wire 264 and a second electric wire 266. The first and second electric wires 264 and 266 may be referred to as an inner electric wire 264 and an outer electric wire 266, respectively. The first and second electric wires 264 and 266 may include connectors 264*a* and 266*a* configured to mutually connect the first and second electric wires 264 and 266.

The door 230 may include a connector seating portion 237 to connect the first and second electric wires 264 and 266. The first and second connectors 264*a* and 266*a* formed at ends of the first and second electric wires 264 and 266, respectively, may be configured to allow a mutual coupling of the first and second connectors 264*a* and 266*a* at the connector seating portion 237. The connector seating portion 237 may be formed at an upper portion of the inner door 231 and may form a seating space 237*a* at an upper surface of the inner door 231. The connector seating portion 237 may be formed to be recessed on the upper surface of the inner door 231. The door 230 may include a cover 237*b* to cover the seating space 237*a* of the connector seating portion 237. The cover 237*b* may be provided to be located on the same plane as the upper surface of the inner door 231. The upper surface of the inner door 231 and an upper portion of the connector seating portion 237 may be configured to not have a height difference with an upper surface of the outer door 232. That is, the upper surface of the inner door 231, the upper surface of the connector seating portion 237, and the upper surface of the outer door 232 may be configured to be located at the same height. With such a configuration, an aesthetic impression of an exterior appearance of the door 230 may be improved, and exposure of the connector seating portion 237 to the outside may be minimized to significantly reduce external influences.

The first electric wire 264 may be separably connected to the main body electric wire 277 of the main body 210, and may be connected to a controller (not shown) or a power supply device (not shown) that is connected to the main body electric wire 277. The first electric wire 264 may extend to the inner door 231 to be connected to the second electric wire 266. The first electric wire 264 may be connected to the connector seating portion 237 through a first electric wire outlet 237*c* of the inner door 231. One end of the first electric wire 264 may be withdrawn through a hollow portion 274*a* of a hinge rotation axis 274 to be connected to the main body electric wire 277. The other end of the first electric wire 264 may be withdrawn through the first electric wire outlet 237*c* formed at the connector seating portion 237 to be connected to the second electric wire 266.

The second electric wire 266 may be configured to be connected to an electric device installed at the outer door 232. For example, the second electric wire 266 may be connected to the display device 260 to transmit information between the display device 260 and the controller or to supply power to the display device 260.

The first and second electric wires 264 and 266 are coupled at the connector seating portion 237 of the inner door 231 to facilitate separation of the outer door 232 from the inner door 231. That is, when the outer door 232 is separated from the inner door 231, the first and second connectors 264*a* and 266*a* of the first and second electric wires 264 and 266, which are seated at the connector seating portion 237, may separate from each other such that an electrical connection may be disconnected or released, and the outer door 232 may be physically separated from the inner door 231.

For convenience of description, each of the first and second electric wires 264 and 266 is described as a single wire, but a plurality of the first and second electric wires 264 and 266 may be formed.

The main body electric wire 277 and the first and second electric wires 264 and 266 may be connected in series. That is, the main body electric wire 277, the first electric wire 264, and the second electric wire 266 may be provided to be sequentially connected. The outer door 232 is provided to be separable from the inner door 231 together with the second electric wire 266, and the inner door 231 is provided to be separable from the main body 210 together with the first electric wire 264.

By disconnecting the first electric wire 264 from either the main body electric wire 277 or the second electric wire 266, the inner door 231 or the outer door 232 may be configured to be selectively separable. That is, by disconnecting the main body electric wire 277 from the first electric wire 264, the inner door 231 is in a state of being separable from the main body 210. Since the outer door 232 is coupled to the inner door 231, both of the inner door 231 and the outer door 232 are in a state of being separable from the main body 210 through the above-described process. Further, by disconnecting the second electric wire 266 from the first electric wire 264, the outer door 232 is in a state of being separable from the inner door 231. With such a configuration, when the door 230 is assembled to or separated from the main body 210, assembly of the refrigerator 201 may be improved. That is, when the door 230 is coupled to the main body 210, the inner door 231 and the outer door 232 may be sequentially coupled to the main body 210, or both of the inner door 231 and the outer door 232, which are coupled to each other, may be coupled to the main body 210. A separation of the door 230 from the main body 210 may be performed in an order opposite to that in which the door 30 is coupled to the main body 10.

The door 230 may include a hinge assembly 280. The hinge assembly 280 may be a component of the inner door 231. The hinge assembly 280 may be connected to the connector seating portion 237, and may be configured to form a center of rotation of the outer door 232. The hinge assembly 280 may be configured to guide the second electric wire 266 from the center of rotation of the outer door 232 to the connector seating portion 237.

The hinge assembly 280 may be provided to be separable from the inner door 231. The hinge assembly 280 may guide the second electric wire 266 from the outer door 232 to the inner door 231, and may form the center of rotation of the outer door 232 relative to the inner door 231.

The hinge assembly 280 may include a hinge bracket 282. The hinge bracket 282 is provided at one door 230 of the inner door 231 and the outer door 232, and is configured to allow the other door 230 to be rotatable. In the present embodiment, the hinge bracket 282 is installed at the inner door 231, and the outer door 232 is configured to be rotated on the basis of a rotational shaft 283 formed at the hinge bracket 282. However, the present disclosure is not limited to the described above, the hinge bracket 282 may be installed at the outer door 232, and the rotational shaft 283 formed at the hinge bracket 282 may be configured to be coupled to the inner door 231 to allow the outer door 232 to be rotated relative to the inner door 231. The hinge bracket 282 may be disposed adjacent to the connector seating portion 237. The hinge bracket 282 may include a hinge body 282*a* and the rotational shaft 283.

The hinge assembly 280 may include an electric wire guide 286.

The electric wire guide 286 may form a guide space 287 guiding the second electric wire 266. The electric wire guide 286 may be configured as a configuration separate from the hinge bracket 282. However, the present disclosure is not limited to the described above, and the electric wire guide 286 and the hinge bracket 282 may be integrally formed. The electric wire guide 286 may be connected to the connector seating portion 237, and may be formed to extend to the center of rotation of the outer door 232. With such a configuration, the second electric wire 266 may be guided from the center of rotation of the outer door 232 to the connector seating portion 237 through the guide space 287 of the electric wire guide 286.

The electric wire guide 286 may include a guide opening 286*c* connected to the seating space 237*a* of the connector seating portion 237. The second electric wire 266 may be disposed in the seating space 237*a* of the connector seating portion 237 by passing through the guide space 287 of the electric wire guide 286 via the guide opening 286*c*. Even though the cover 237*b* and the guide cover 286*b* are seated on the connector seating portion 237 and the guide body 286*a*, respectively, the guide opening 286*c* may be maintained in an open state.

The electric wire guide 286 may include a guide body 286*a* having an open one side and a guide cover 286*b* configured to cover the open one side. The guide body 286*a* may be recessed to form the guide space 287.

The outer door 232 includes an assembly insertion portion 289 provided at an inner surface of the outer door 232, which faces the inner door 231, and formed to be recessed to allow at least a portion of the hinge assembly 280 to pass through the assembly insertion portion 289.

The assembly insertion portion 289 is configured such that, in a state in which the outer door 232 and the inner door 231 are in close contact with each other, the hinge assembly 280 formed to protrude from the inner door 231 does not interfere with an operation of the outer door 232. The assembly insertion portion 289 may be formed to be recessed on the inner surface of the outer door 232.

The outer door 232 may include an extension guide 288 provided at an upper portion of the assembly insertion portion 289 and through which the second electric wire 266 passes. The extension guide 288 is provided to be separable from the outer door 232. The extension guide 288 is provided to guide the second electric wire 266, which is connected from the electric device of the outer door 232, to the electric wire guide 286. When the extension guide 288 is installed at the outer door 232, the extension guide 288 may be provided to form a surface coinciding with the inner surface of the outer door 232.

The extension guide 288 may include a guide rib 288*a*, a guide cover 288*b*, and a guide space 288*c*. The outer door 232 may include a second electric wire outlet 290 disposed at an end of the extension guide 288. The second electric wire 266 may be withdrawn from the second electric wire outlet 290 to be guided through the guide space 288*c* of the extension guide 288. The guide rib 288*a* extending from the second electric wire outlet 290 to the center of rotation of the outer door 232 may be formed on an inner side surface of the outer door 232. The guide cover 288*b* may be configured to cover the guide rib 288*a* to prevent the second electric wire 266 from being exposed to the outside. The guide rib 288*a* and the guide cover 288*b* are configured to guide the second electric wire 266 from the second electric wire outlet 290 toward the center of rotation of the outer door 232. The guide rib 288*a* and the guide cover 288*b* may form the guide space 288*c* guiding the second electric wire 266.

The guide cover 288*b* may be configured to be fitted in and coupled to the inner side surface of the outer door 232. A coupling hole 232*a* may be formed at the outer door 232, and the guide cover 288*b* may include a coupling protrusion 288*bb* inserted into the coupling hole 232*a*. The coupling protrusion 288*bb* may be elastically formed at a cover body 288*ba* of the guide cover 288*b*. The coupling hole 232*a* may be formed at the upper surface of the outer door 232, and the coupling protrusion 288*bb* may be formed at one side surface of the guide cover 288*b*, more specifically at an upper surface of the cover body 288*ba*. When the guide cover 288*b* is installed at the inner side surface of the outer door 232, the coupling protrusion 288*bb* is inserted to be fitted in and coupled to the coupling hole 232*a*.

In order to separate the guide cover 288*b* from the outer door 232, the coupling protrusion 288*bb* inserted into the coupling hole 232*a* is pressurized to protrude from the coupling hole 232*a*. Since the coupling protrusion 288*bb* is provided to have elasticity with respect to the cover body 288*ba*, when the guide cover 288*b* is separated from the outer door 232, the coupling protrusion 288*bb*, which has been pressurized and depressed, elastically returns to its original position.

The extension guide 288 guides the second electric wire 266 to the center of rotation of the outer door 232, and the electric wire guide 286 guides the second electric wire 266 from the center of rotation of the outer door 232 to the connector seating portion 237. With such a configuration, the second electric wire 266 passing through the electric wire guide 286 may pass through the center of rotation of the outer door 232 to extend to the hinge assembly 280.

With such a configuration, even when the inner door 231 or the outer door 232 is rotated, a distance, an angle, and an arrangement between the rotational shaft 283 and the connector seating portion 237 may be kept constant. In this way, a length of the second electric wire 266 may be kept constant. The second electric wire 266 may extend to the connector seating portion 237 without being affected by a rotational movement of the door 230.

The first electric wire 264 may be connected to the main body electric wire 277 of the main body 210, and may be configured to pass through the hollow portion 274*a* formed in the hinge rotation axis 274. The first electric wire 264 may extend to the connector seating portion 237 by passing through the hollow portion 274*a* and a lower portion of the upper surface of the inner door 231. The first electric wire 264 extending to the connector seating portion 237 may be connected to the second electric wire 266 extending to the connector seating portion 237.

Assembly and disassembly of the refrigerator according to an embodiment of the present disclosure will be described below.

Figure 27:
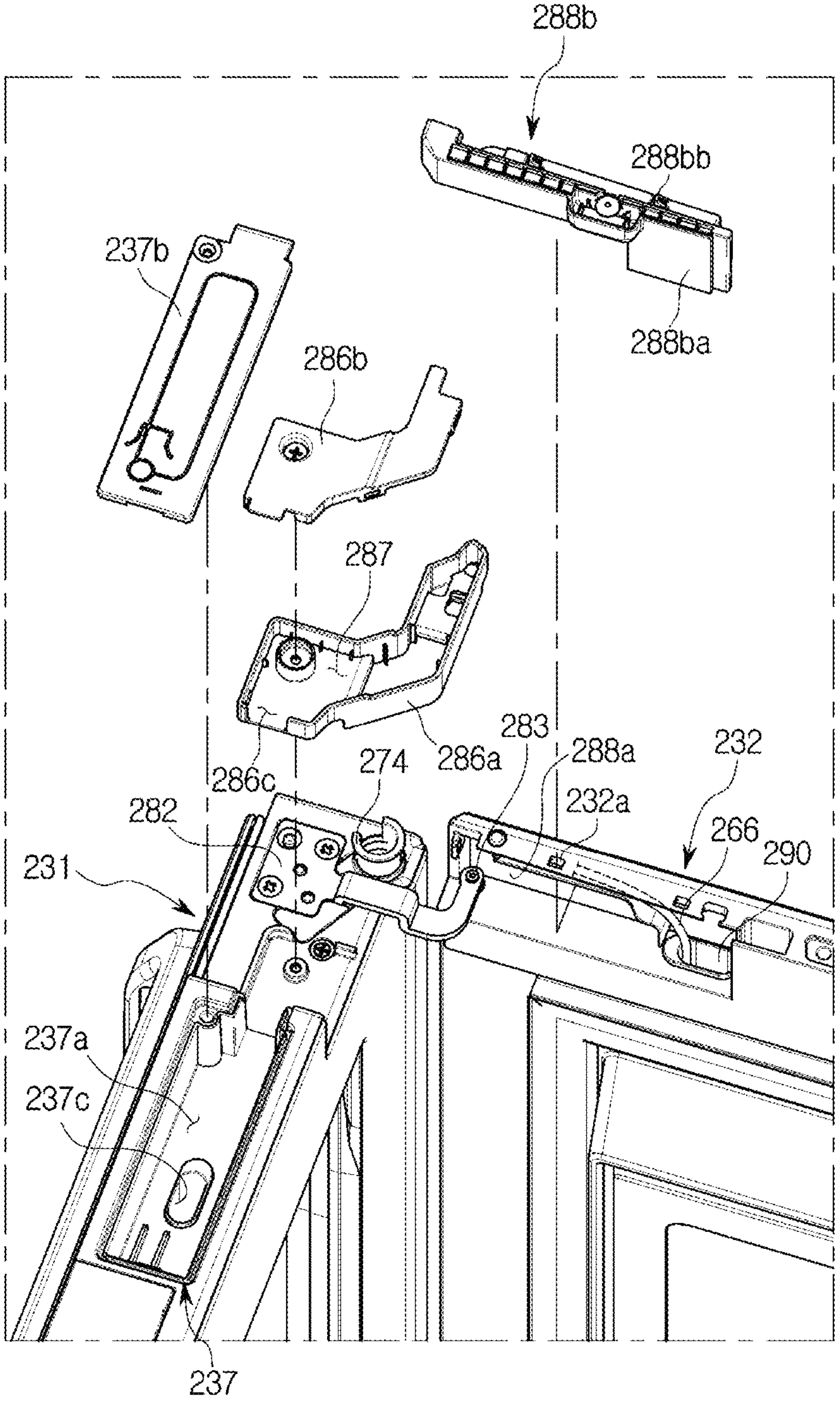
FIG. 27 is an exploded perspective view of some components of the refrigerator according to yet another embodiment of the present disclosure.

FIG. 27 is an exploded perspective view of some components of the refrigerator according to yet another embodiment of the present disclosure. Descriptions will be made with reference to the preceding drawings.

A method of separating the outer door 232 from the inner door 231 will be described.

The cover 237*b* is opened from the connector seating portion 237 and the first and second connectors 264*a* and 264*b* disposed in the seating space 237*a* are separated from each other. When the guide cover 286*b* of the electric wire guide 286 is opened, the second electric wire 266 is exposed to the outside.

That is, when the first and second connectors 264*a* and 264*b* are separated from each other and the cover 237*b* and the guide cover 286*b* are separated from the connector seating portion 237 and the guide body 286*a*, respectively, the second electric wire 266 is in a state of having been separable from the inner door 231.

The hinge assembly 280 is separated from the inner door 231 such that the outer door 232 is separated from the inner door 231. However, the present disclosure is not limited the described above, the outer door 232 may be separated from the rotational shaft 283 formed at the hinge bracket 282 such that the outer door 232 may be separated from the inner door 231. Alternatively, the guide cover 288*b* of the extension guide 288 may be separated from the outer door 232, and then the outer door 232 may be separated from the inner door 231.

Next, a method of separating the inner door 231 from the main body 210 will be described. In the case of the refrigerator according to the present embodiment, when the inner door 231 is separated from the main body 210, the process of separating the outer door 232 from the inner door 231 is not necessarily preceded. Alternatively, the outer door 232 may be separated from the inner door 231, and then the inner door 231 may be separated from the main body 210. However, the present disclosure is not limited thereto, and in a state in which the inner door 231 and the outer door 232 are coupled, the inner door 231 may be separated from the main body 210. In this case, the door 230 is separated from the main body 210.

After a main body cover 276 provided at an upper portion of the main body 210 is separated therefrom, a main body connector 277*a* of the main body electric wire 277 and a connection connector 264*b* of the first electric wire 264 are separated from each other. Through such an operation, an electrical connection between the door 230 and the main body 210 may be disconnected. Consequently, the door 230 is in a state of being separable from the main body 210. Thereafter, a door hinge 270 and the hinge rotation axis 274 are separated from each other, the door 230 may be separated from the main body 210.

An operation of the refrigerator according to the embodiment of the present disclosure will be described below.

Figure 28:
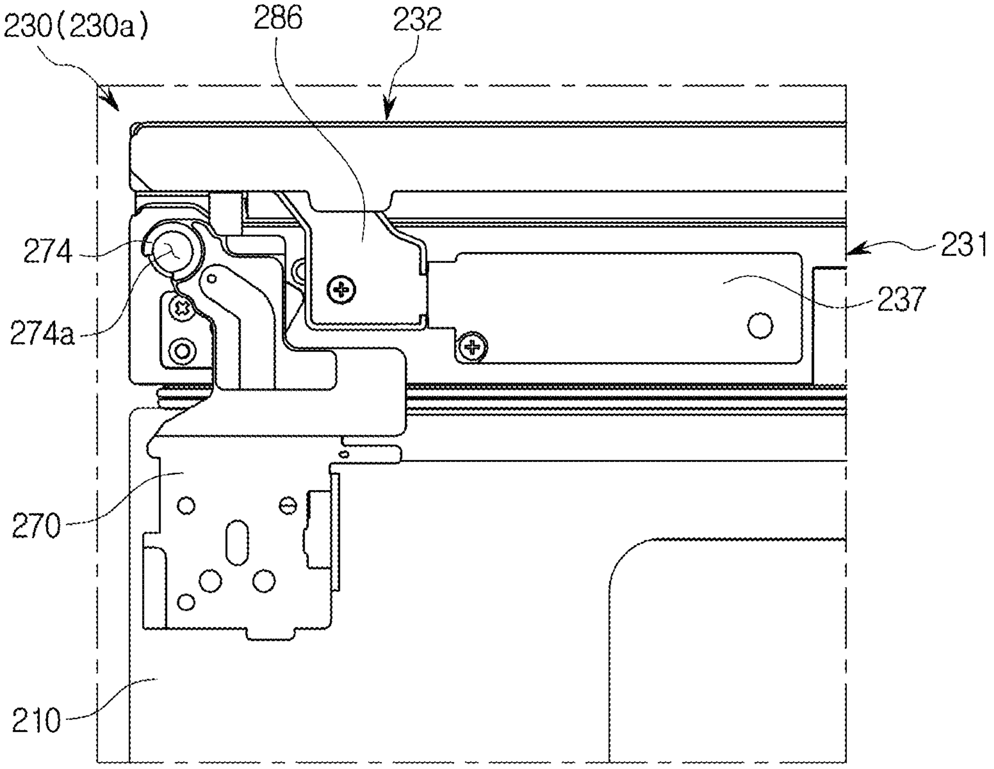
FIGS. 28, 29, and 30 are diagrams illustrating operations of the refrigerator according to yet another embodiment of the present disclosure.
Figure 29:
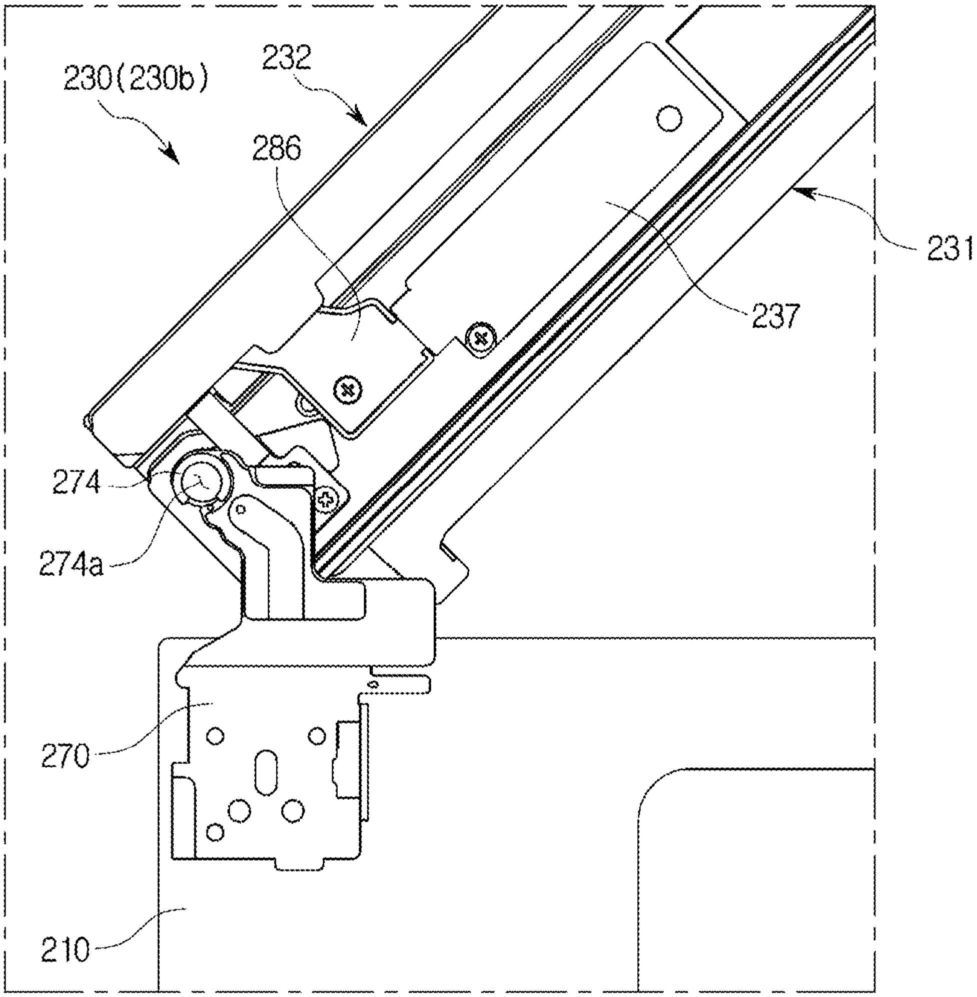
Figure 30:
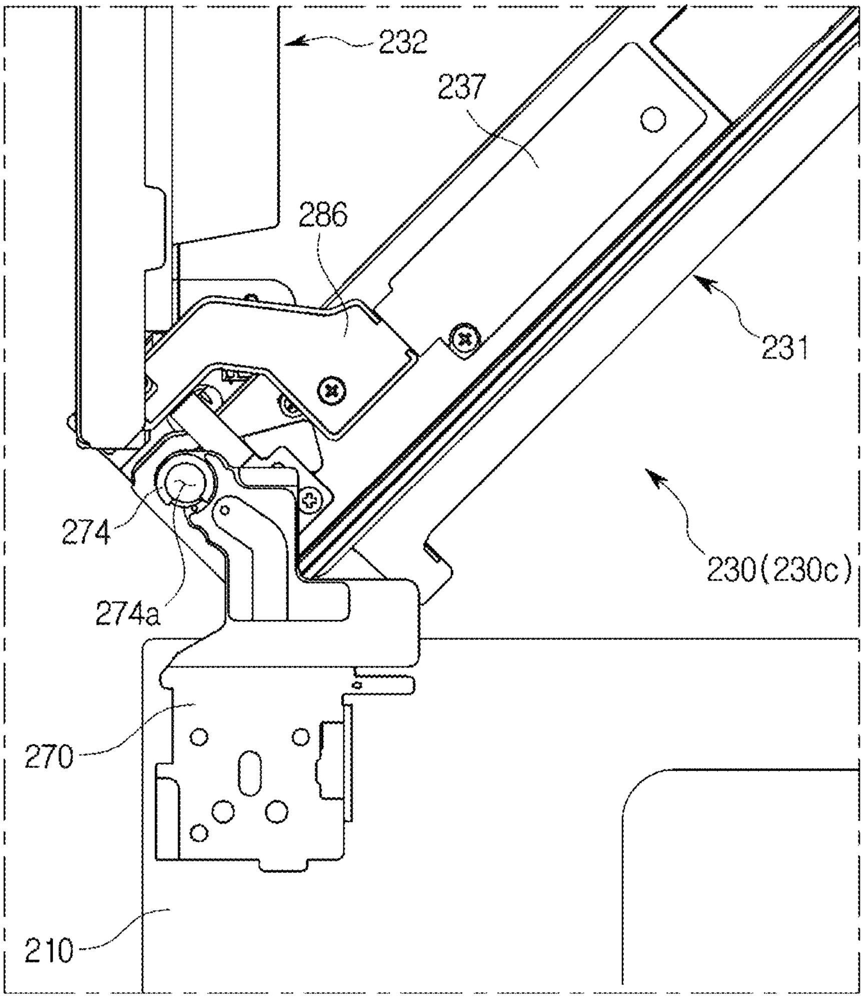

FIGS. 28, 29, and 30 are diagrams illustrating operations of the refrigerator according to yet another embodiment of the present disclosure.

FIG. 28 illustrates a closed state 230*a* in which both of the outer door 232 and the inner door 231 are closed, FIG. 29 illustrates a partially open state 230*b* in which the outer door 232 is in opened and the inner door 231 is closed, and FIG. 30 illustrates an open state 230*c* in which the inner door 231 is opened relative to the main body 210 and the outer door 232 is opened relative to the inner door 231. Although not shown in the drawing, both of the inner door 231 and the outer door 232 may operate in an open state with respect to the main body 210. For convenience of description, a state of the door 230 in FIG. 28 may be referred to as the closed state 230*a*, a state of the door 230 in FIG. 29 may be referred to as the partially open state 230*b*, and a state of the door 230 in FIG. 30 may be referred to as an open state 230*c*. In the open state 230*c* of the door 230, the inner door 231 and the outer door 232 may be separated as shown in FIG. 10, but both of the inner door 231 and the outer door 232 may be in close contact with each other to operate in an open state with respect to the main body 210.

In the closed state 230*a* as shown in FIG. 28, the inner door 231 is rotatably provided at the main body 210 by the door hinge 270, and the outer door 232 is rotatably provided at the inner door 231 by the hinge assembly 280.

Descriptions will be made with reference to FIG. 29. In the partially open state 230*b*, the outer door 232 is separated from the inner door 231 and is rotated on the basis of the rotational shaft 283 of the hinge assembly 280. Since the hinge assembly 280 is installed at the inner door 231, the hinge assembly 280 is fixed to the inner door 231 without moving even when the outer door 232 is rotated.

Descriptions will be made with reference to FIG. 30. In the open state 230*c*, the outer door 232 is separated from the inner door 231 and is rotated on the basis of the rotational shaft 283 of the hinge assembly 280, and the inner door 231 is separated from the main body 210 and is rotated on the basis of the hinge rotation axis 274 of the door hinge 270. As shown in FIG. 30, since the hinge assembly 280 is installed at the inner door 231, even when the outer door 232 and the inner door 231 are rotated, the hinge assembly 280 is fixed to the inner door 231 without operation. With such a configuration, the distance, angle, and arrangement between rotational shaft 283 of the hinge assembly 280 and the connector seating portion 237 may be kept constant even when the door 230 is being rotated, so that the second electric wire 266 extending from the rotational shaft 283 of the outer door 232 to the connector seating portion 237 may not be affected by the operation of the door 230. Furthermore, since the second electric wire 266 is connected to the first electric wire 264 without being affected by the operations of the outer door 232 and the inner door 231, power may be stably supplied to electronic devices installed at the outer door 232, and a signal transmission between the electronic devices and a controller may be smoothly performed. In addition, the second electric wire 266 is not affected by repetitive rotational operations of the door 230 such that durability of the second electric wire 266 can be improved.

In accordance with one aspect of the present disclosure, the connection between the electronic device and the refrigerator is improved such that durability of the electric wires can be improved.

In accordance with another aspect of the present disclosure, connections between the electric wires are improved so as not to be influenced by the rotational movement of the door such that durability of the electric wires can be improved.

In accordance with still another aspect of the present disclosure, exposure of the electric wires can be minimized such that damage from external influences can be significantly reduced.

In accordance with yet another aspect of the present disclosure, the display device is applied to the door such that user convenience can be improved.

In accordance with yet another aspect of the present disclosure, an arrangement structure of electric components is improved such that space efficiency can be improved and heat insulation efficiency of the refrigerator can be improved.

Hereinbefore, specific embodiments are shown and described. However, the present disclosure is not limited to these specific embodiments, various modified embodiments can be devised from those skilled in the art without departing from the gist of a technical spirit that is defined by the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator comprising:

a main body including a storage compartment;

an inner door rotatably provided at the main body;

an outer door configured to open or close the storage compartment together with the inner door and rotatably provided at the inner door; and a connector positioned in the inner door and configured to connect a first electric wire, which is connected to a main body electric wire of the main body, with a second electric wire extending from the outer door to the inner door, wherein the outer door is provided to be separable from the inner door together with the second electric wire, and wherein the inner door is provided to be separable with the first electric wire from both the main body electric wire of the main body and the second electric wire of the outer door.

2. The refrigerator of claim 1, wherein the connector includes a first connector formed at an end of the first electric wire and a second connector formed at an end of the second electric wire.

3. The refrigerator of claim 2, wherein the inner door includes a connector seating portion disposed at an upper portion of the inner door and including a seating space, and the first connector and the second connector are separably coupled to each other in the seating space.

4. The refrigerator of claim 3, wherein:

the inner door and the outer door move between:

an open state for opening the storage compartment, a closed state for closing the storage compartment, and a partially open state where the outer door is opened from the inner door, and while the inner door and the outer door are moving among the open state, the closed state, and the partially opened state, a first length of the first electric wire extending from the main body to the connector seating portion is kept constant and a second length of the second electric wire extending from the outer door to the connector seating portion is kept constant.

5. The refrigerator of claim 3, wherein the outer door is provided so that as the first connector and the second connector separate from each other in the connector seating portion, the outer door becomes electrically disconnected from the inner door.

6. The refrigerator of claim 3, wherein the inner door further includes a hinge assembly connected to the connector seating portion at one side thereof and configured to form a rotation center of the outer door at another side thereof.

7. The refrigerator of claim 6, wherein the hinge assembly is configured to guide the second electric wire from the center of rotation of the outer door to the connector seating portion.

8. The refrigerator of claim 7, wherein the hinge assembly is configured to form a guide space from the center of rotation of the outer door to the connector seating portion to prevent the second electric wire from being exposed to the outside.

9. The refrigerator of claim 6, wherein the hinge assembly includes:

a hinge bracket fixed to the inner door and forming the rotation center of the outer door separated from the inner door; and a hinge cover configured to cover the hinge bracket and extending from the outer door to the connector seating portion.

10. The refrigerator of claim 1, wherein the first electric wire is separably connected to at least one of a controller or a power supply device.

11. The refrigerator of claim 10, wherein the second electric wire is configured to be connected to a display device installed at the outer door.

12. The refrigerator of claim 11, wherein the first electric wire is configured to transfer power supplied from the power supply device to the second electric wire, and the second electric wire is configured to supply power transferred from the first electric wire to the display device.

13. The refrigerator of claim 11, wherein the first electric wire is configured to transmit information between the controller and the second electric wire, and the second electric wire is configured to transmit information between the first electric wire and the display device.

14. A refrigerator comprising:

a main body including a storage compartment;

an inner door rotatably installed at the main body, the inner door including an inner electric wire connected to a main body electric wire of the main body and configured to pass through the inner door;

an outer door rotatably provided at the inner door and configured to open or close the storage compartment together with the inner door, the outer door including an outer electric wire connected to an electric device of the outer door and provided to extend from the outer door to the inner door and be separable from the inner electric wire; and a connector positioned in the inner door and configured to connect the inner electric wire with the outer electric wire, wherein the outer door is provided to be separable from the inner door together with the outer electric wire, and wherein the inner door is provided to be separable with the inner electric wire from both the main body electric wire of the main body and the outer electric wire of the outer door.

15. The refrigerator of claim 14, further comprising a connector seating portion formed at an upper portion of the inner door to form a space, wherein:

the connector comprises a first connecting portion formed at an end of the outer electric wire and a second connecting portion formed at an end of the inner electric wire, and the first connection portion and the second connection portion are coupled in the space.

16. The refrigerator of claim 15, wherein:

the inner door and the outer door move between:

an open state for opening the storage compartment, a closed state for closing the storage compartment, and a partially open state where the outer door is opened from the inner door, and while the inner door and the outer door are moving among the open state, the closed state, and the partially opened state, a first length of the inner electric wire extending from the main body to the connector seating portion is kept constant and a second length of the outer electric wire extending from the outer door to the connector seating portion is kept constant.

17. The refrigerator of claim 15, wherein the outer door further includes a hinge assembly including a guide space extending from a center of rotation of the outer door to the connector seating portion so as to prevent the outer electric wire from being exposed to the outside, wherein the hinge assembly is connected to the connector seating portion and configured to form the center of rotation of the outer door.

* * * * *